United States Patent
Hoyer et al.

(10) Patent No.: US 10,440,012 B2
(45) Date of Patent: Oct. 8, 2019

(54) CLOUD CARD APPLICATION PLATFORM

(71) Applicant: ASSA ABLOY AB, Stockholm (SE)

(72) Inventors: Philip Hoyer, Richmond (GB); Mark Robinton, Eden Prairie, MN (US); Julian Eric Lovelock, Pleasanton, CA (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/308,978

(22) PCT Filed: Nov. 3, 2014

(86) PCT No.: PCT/IB2014/002986
§ 371 (c)(1),
(2) Date: Nov. 4, 2016

(87) PCT Pub. No.: WO2016/009245
PCT Pub. Date: Jan. 21, 2016

(65) Prior Publication Data
US 2017/0118201 A1    Apr. 27, 2017

Related U.S. Application Data

(60) Provisional application No. 62/024,826, filed on Jul. 15, 2014.

(51) Int. Cl.
*H04L 29/06* (2006.01)
*G06K 19/07* (2006.01)
*H04W 12/06* (2009.01)

(52) U.S. Cl.
CPC ...... *H04L 63/0838* (2013.01); *G06K 19/0723* (2013.01); *H04L 63/0815* (2013.01); *H04L 63/0853* (2013.01); *H04W 12/06* (2013.01)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS 6,961,000 B2   11/2005   Chung
7,295,114 B1   11/2007   Drzaic et al.
(Continued)

FOREIGN PATENT DOCUMENTS

CN   102663591   9/2012
EP   1710764    10/2006
(Continued)

OTHER PUBLICATIONS

"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].
(Continued)

*Primary Examiner* — Sharif E Ullah
(74) *Attorney, Agent, or Firm* — Schwegman Lundberg & Woessner, P.A.

(57) ABSTRACT

A cloud card application platform is provided. The cloud card application platform enables one or more card applications to be virtualized on at least one server that is available to mobile devices via a communication network, such as the Internet. The one or more card applications virtualized on the cloud card application platform are capable of being managed remotely by service providers that have deployed and developed the one or more applications.

18 Claims, 12 Drawing Sheets

(56) References Cited

U.S. PATENT DOCUMENTS

| | | | |
|---|---|---|---|
| 7,942,312 | B2 | 5/2011 | van Ingen |
| 7,965,184 | B1 | 6/2011 | Nichols et al. |
| 8,074,271 | B2 | 12/2011 | Davis et al. |
| 8,285,211 | B2 | 10/2012 | Wang et al. |
| 8,344,853 | B1 | 1/2013 | Warner et al. |
| 8,429,409 | B1 | 4/2013 | Wall et al. |
| 8,880,027 | B1 | 11/2014 | Darringer |
| 9,406,046 | B2 | 8/2016 | Kawaguchi et al. |
| 9,681,302 | B2 | 6/2017 | Robinton et al. |
| 9,685,057 | B2 | 6/2017 | Robinton et al. |
| 2004/0093493 | A1 | 5/2004 | Bisbee et al. |
| 2005/0061875 | A1 | 3/2005 | Zai et al. |
| 2006/0230276 | A1 | 10/2006 | Nochta |
| 2006/0277061 | A1 | 12/2006 | Revanur et al. |
| 2007/0052517 | A1 | 3/2007 | Bishop et al. |
| 2007/0106892 | A1 | 5/2007 | Engberg |
| 2007/0180493 | A1* | 8/2007 | Croft ............... G06F 3/1415 726/2 |
| 2008/0069347 | A1 | 3/2008 | Brown et al. |
| 2008/0122584 | A1 | 5/2008 | Itasaki et al. |
| 2009/0055597 | A1 | 2/2009 | Robles |
| 2009/0108063 | A1 | 4/2009 | Jain et al. |
| 2009/0240946 | A1 | 9/2009 | Yeap et al. |
| 2010/0007466 | A1 | 1/2010 | Shoarinejad et al. |
| 2010/0079237 | A1 | 4/2010 | Falkk et al. |
| 2010/0299527 | A1 | 11/2010 | Arunan et al. |
| 2011/0025458 | A1 | 2/2011 | Rokhsaz et al. |
| 2011/0074552 | A1 | 3/2011 | Norair et al. |
| 2011/0249682 | A1* | 10/2011 | Kean ............... H04L 45/00 370/401 |
| 2012/0013448 | A1 | 1/2012 | Baranowski |
| 2012/0159105 | A1 | 6/2012 | Von Behren et al. |
| 2012/0207305 | A1 | 8/2012 | Gallo et al. |
| 2012/0234908 | A1 | 9/2012 | Wang et al. |
| 2012/0265988 | A1 | 10/2012 | Ehrensvard |
| 2013/0039634 | A1* | 2/2013 | M ............... G08B 13/19645 386/230 |
| 2013/0061303 | A1 | 3/2013 | Hart et al. |
| 2013/0102252 | A1 | 4/2013 | Rasmussen et al. |
| 2013/0166917 | A1 | 6/2013 | Granbery |
| 2013/0215467 | A1 | 8/2013 | Fein et al. |
| 2013/0222107 | A1* | 8/2013 | Herscovitch ............ G05B 1/01 340/5.6 |
| 2013/0237148 | A1 | 9/2013 | McCann et al. |
| 2013/0254116 | A1 | 9/2013 | Hayshow et al. |
| 2013/0303085 | A1* | 11/2013 | Boucher ............ H04W 4/80 455/41.1 |
| 2013/0314214 | A1* | 11/2013 | Leica ............... H04W 4/80 340/10.1 |
| 2013/0314334 | A1* | 11/2013 | Leica ............... H04B 5/0056 345/173 |
| 2013/0344804 | A1* | 12/2013 | Chen ............... H04B 5/02 455/41.1 |
| 2013/0344808 | A1 | 12/2013 | Murray et al. |
| 2014/0013406 | A1 | 1/2014 | Tremlet |
| 2014/0023195 | A1 | 1/2014 | Lee et al. |
| 2014/0075572 | A1 | 3/2014 | Mehring et al. |
| 2014/0118113 | A1 | 5/2014 | Kaushik et al. |
| 2014/0123056 | A1 | 5/2014 | Puranik et al. |
| 2014/0173708 | A1* | 6/2014 | Garlick ............ H04L 63/08 726/7 |
| 2014/0256251 | A1* | 9/2014 | Caceres ............ H04B 5/0031 455/41.1 |
| 2014/0282974 | A1 | 9/2014 | Maher et al. |
| 2014/0337205 | A1* | 11/2014 | Tavares ............ G06Q 20/204 705/39 |
| 2014/0357187 | A1 | 12/2014 | Ehrensvard |
| 2015/0103383 | A1* | 4/2015 | Dowling ............ H04N 1/00225 358/402 |
| 2015/0363599 | A1 | 12/2015 | Hoyer et al. |
| 2016/0021091 | A1 | 1/2016 | Hoyer et al. |
| 2016/0021100 | A1 | 1/2016 | Hoyer |
| 2016/0142210 | A1 | 5/2016 | Hoyer et al. |
| 2016/0205549 | A1 | 7/2016 | Hoyer et al. |

FOREIGN PATENT DOCUMENTS

| | | |
|---|---|---|
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |

OTHER PUBLICATIONS

"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].

"NFC Signature Record Type Definition (RTD) Technical Specification," NFC Forum, Nov. 18, 2010, 18 pages [retrieved from: http://members.nfc-forum.org/specs/spec_license].

"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].

Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].

Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].

Kilas et al. "Digital Signatures on NFC Tags Master of Science Thesis," Mar. 18, 2009, 53 Pages [retrieved from: http://web.it.kth.se/~johanmon/theses/kilas.pdf].

Leicher et al. "Smart OpenID: A Smart Card Based OpenID Protocol," IFIP Advances in Information and Communication Technology, 2012, vol. 376, pp. 75-86.

Pearson "Securing the Pharmaceutical Supply Chain with RFID and Public-key infrastructure (PKI) Technologies," Texas Instruments, Jun. 2005, White Paper, 12 pages.

Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.

Saeed et al. "Off-line NFC Tag Authentication," The 7th International Conference for Internet Technology and Secured Transactions, 2012 International Conference for IEEE, Dec. 10, 2012, pp. 730-735.

Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.

Staake et al., "Extending the EPC Network—The Potential of RFID in Anti-Counterfeiting," Symposium on Applied Computing, 2005, pp. 1607-1612.

Tan et al. "A Robust and Secure RFID-Based Pedigree System (Short Paper)," Information and Communications Security Lecture Notes in Computer Science, Jan. 2006, pp. 21-29.

Vassilev et al. "Personal Brokerage of Web Service Access," Security & Privacy, Sep. 2007, vol. 5, No. 5, pp. 24-31.

International Search Report and Written Opinion for International (PCT) Patent Application No. PCT/IB2013/002617, dated Feb. 19, 2014 12 pages.

International Preliminary Report on Patentability for International (PCT) Patent Application No. PCT/IB2013/002617, dated Mar. 19, 2015 8 pages.

International Search Report and Written Opinion for International (PCT) Patent Application No. PCT/IB2013/001949, dated Feb. 25, 2014 15 pages.

(56) References Cited

OTHER PUBLICATIONS

International Preliminary Report on Patentability for International (PCT) Patent Application No. PCT/IB2013/001949, dated Jan. 14, 2016 10 pages.
International Search Report and Written Opinion for International (PCT) Patent Application No. PCT/IB2014/001558, dated Nov. 12, 2014 11 pages.
International Preliminary Report on Patentability for International (PCT) Patent Application No. PCT/IB2014/001558, dated Sep. 24, 2015 7 pages.
Official Action for European Patent Application No. 14758165.6, dated Dec. 8, 2016, 9 pages.
International Search Report and Written Opinion for International (PCT) Patent Application No. PCT/IB2014/000853, dated Sep. 17, 2014 15 pages.
International Preliminary Report on Patentability for International (PCT) Patent Application No. PCT/IB2014/000853, dated Sep. 24, 2015 10 pages.
International Search Report and Written Opinion for International (PCT) Patent Application No. PCT/IB2014/000812, dated Sep. 18, 2014 13 pages.
International Preliminary Report on Patentability for International (PCT) Patent Application No. PCT/IB2014/000812, dated Sep. 24, 2015 8 pages.
Official Action for Australian Patent Application No. 2014229568, dated Feb. 8, 2017, 3 pages.
International Search Report and Written Opinion for International (PCT) Patent Application No. PCT/IB2014/000843, dated Sep. 12, 2014 13 pages.
International Preliminary Report on Patentability for International (PCT) Patent Application No. PCT/IB2014/000843, dated Sep. 24, 2015 8 pages.
Official Action for Australian Patent Application No. 2014229575, dated Feb. 7, 2017, 3 pages.
International Search Report and Written Opinion for International (PCT) Patent Application No. PCT/IB2014/002157, dated Feb. 17, 2015 12 pages.
International Preliminary Report on Patentability for International (PCT) Patent Application No. PCT/IB2014/002157, dated Dec. 29, 2016 8 pages.
International Search Report and Written Opinion for International (PCT) Patent Application No. PCT/IB2014/002986, dated Jun. 30, 2015 19 pages.
International Preliminary Report on Patentability for International (PCT) Patent Application No. PCT/IB2014/002986, dated Jan. 26, 2017 14 pages.
Official Action for U.S. Appl. No. 14/426,180, dated Apr. 15, 2016 19 pages.
Official Action for U.S. Appl. No. 14/426,180, dated Sep. 8, 2016 30 pages.
Notice of Allowance for U.S. Appl. No. 14/426,180, dated Feb. 6, 2017 10 pages.
Official Action for U.S. Appl. No. 14/897,708, dated Jan. 9, 2017 16 pages.
Official Action for U.S. Appl. No. 14/772,894, dated Aug. 8, 2016 13 pages.
Notice of Allowance for U.S. Appl. No. 14/772,894, dated Feb. 16, 2017 7 pages.
Official Action for U.S. Appl. No. 14/772,921, dated Dec. 30, 2016 26 pages.
Official Action for U.S. Appl. No. 14/772,011, dated Feb. 10, 2017 8 pages Restriction Requirement.
Official Action for U.S. Appl. No. 14/772,011, dated May 8, 2017 13 pages.
Official Action for U.S. Appl. No. 14/772,995, dated Sep. 22, 2016 13 pages.
Final Action for U.S. Appl. No. 14/772,995, dated Jun. 8, 2017 15 pages.
Official Action for U.S. Appl. No. 14/306,078, dated Jul. 2, 2015 11 pages.
Official Action for U.S. Appl. No. 14/306,078, dated Mar. 1, 2016 11 pages.
Official Action for U.S. Appl. No. 14/306,078, dated Oct. 12, 2016 14 pages.
Notice of Allowance for U.S. Appl. No. 14/306,078, dated Mar. 13, 2017 6 pages.
Fouladgar et al. "A Simple Privacy Protecting Scheme Enabling Delegation and Ownership Transfer for RFID Tags," Journal of Communications, Nov. 2007, vol. 2, No. 6, pp. 6-13.
Notice of Allowance for U.S. Appl. No. 14/772,921, dated Jul. 18, 2017 16 pages.
Official Action for U.S. Appl. No. 14/897,708, dated Aug. 3, 2017 16 pages.
Notice of Allowance for U.S. Appl. No. 14/772,011, dated Aug. 24, 2017 11 pages.
Offical Action for U.S. Appl. No. 14/772,995, dated Oct. 3, 2017 15 pages.
Summons to Attend Oral Proceedings for European Patent Application No. 14758165.6, dated Jun. 21, 2018 13 pages.
Notice of Allowance for U.S. Appl. No. 14/897,708, dated Oct. 24, 2018 13 pages.
Official Action for U.S. Appl. No. 14/772,995, dated Sep. 12, 2018 13 pages.
Official Action for U.S. Appl. No. 14/897,708, dated Feb. 2, 2018 18 pages.
Official Action for European Patent Application No. 14833596.1, dated Mar. 23, 2018 9 pages.
Official Action for U.S. Appl. No. 14/772,995, dated Mar. 26, 2018 13 pages.

* cited by examiner

CLOUD CARD APPLICATION PLATFORM

CROSS REFERENCE TO RELATED APPLICATIONS

This application is a national stage application under 35 U.S.C. 371 of PCT Application No. PCT/IB2014/002986 having an international filing date of Nov. 3, 2014, which designated the United States, which PCT application claimed the benefit of U.S. Application Ser. No. 62/024,826, filed on Jul. 15, 2014, both of which are incorporated by reference in their entirety.

FIELD OF THE DISCLOSURE

The present disclosure is generally directed to access control systems and more specifically to devices that are configured to provide access information for access control systems.

BACKGROUND

A smart card, chip card, or integrated circuit card (ICC) is any pocket-sized card with embedded integrated circuits. Smart cards are traditionally made of plastic, generally polyvinyl chloride, but sometimes polyethylene terephthalate based polyesters, acrylonitrile butadiene styrene or polycarbonate. Smart cards can be used for a number of different applications including identification, authentication, data storage and application processing. Both physical access control and logical access control applications have benefited from the use of smart cards.

Access cards in particular have been prevalent for a number of years. The purpose of access cards is to allow a holder thereof to gain entry to a physical or logical asset by presenting their card to a reader and then having the reader authenticate the card and then verify that the card is valid and the holder thereof is entitled access to a protected asset. There are a new generation of access cards available such as the HID Seos® card that can be read by devices (e.g., readers, reader/writers, mobile phones, smartphones, Personal Digital Assistants (PDAs), etc.) supporting NFC/ISO 14443 standards, Bluetooth standards, etc. Four standards currently dominate RFID communication: ISO/IEC 14443-A, ISO/IEC 14443-B, ISO/IEC 15693, and JIS X6319-4, each of which are hereby incorporated herein by reference in their entirety. Most access control systems installed over the last decade can support one or more of these standards, or can be upgraded to support one or more of these standards. Consequently, there is a huge legacy of installed access control readers that use these standards on global basis.

The same standards are used for other applications such as transport, luggage identification, ticketing, payment according to the Contactless EMV standard (Europay, MasterCard, Visa), and more.

One downside to some card technologies is that a user is required to carry separate cards for different applications. In other words, a user has to carry one card for physical access purposes and other card for other applications. With the proliferation of mobile communications, the user is now carrying multiple different access cards in addition to their mobile communication device (e.g., cellular phone, smart phone, etc.). It can be appreciated that having to carry some many different devices presents an inconvenience to users.

SUMMARY

In some card deployment scenarios, there is also the market desire to use the card for multiple applications/services beyond physical access control often provided by different Service Providers but ultimately using the card as an identifier. One example would be a time and attendance service (e.g. provided by Kronos) and a room booking service (e.g., roomzilla) or cashless payment (e.g., Apriva).

Traditionally these service providers had to directly integrate with the specific card technology using proprietary Applicant Programming Interfaces (APIs) and Software Development Kits (SDKs) implemented at a terminal side. When adding an application/service to the individual card, the card must be updated and it is very difficult in multi-Service Provider deployments to manage and restrict what card populations have what application.

It is with respect to the above-identified needs and shortcomings that embodiments of the present disclosure were developed. Specifically, the present disclosure provides a Cloud Card Application Platform (CCAP) that removes the shortcomings mentioned above by enabling easier and more efficient authentication processes, application/service provider selection capabilities, data storage capabilities, and federation to the service provider. Embodiments of the present disclosure also enable simple and easy-to-use management capabilities for individual cards/tags and/or user devices.

With respect to the authentication abilities provided by the cloud CCAP, an HTML browser can be utilized by a user device (e.g., smart phone, Personal Computer (PC), tablet, net book, Personal Digital Assistant (PDA), smart watch, etc.) to facilitate the following:

(i) Card—authenticate the card as genuine using a trusted tag authentication method that employs a Tag Authentication Credential (TAC) or a similar method (ii) User device—authenticate/identify the user device the card has been tapped against using device fingerprinting/device credentials/IP geolocation, etc. or a combination thereof. Additionally there could be on the user device an optional CCAP Application that might orchestrate the interaction with the card over NFC/Bluetooth Low Energy (BLE) and would gather additional local attributes and factors that are the passed to the authentication module on the CCAP to help with card and user device authentication/registration (e.g. collect device fingerprinting attributes, gather geolocation details such as Wi-Fi networks in range or interact with other sensors on the mobile device to establish the authentication context). The CCAP Application could also then be used to automatically launch the browser interacting with the CCAP.

(iii) An optional second card or location tag could also be used to authenticate the location via an NFC tag/NFC trusted tag. Authenticate a second card (to have two card/credential authentication required). Additional identity services for the card/user/application can also be provided via user and/or PIN/password management.

With respect to the application/service provider selection capabilities, the CCAP Application running on the user device may include an application/service selector module that ties a card and/or the user device to a set of configured application/services. Alternatively or additionally, an application/service selection feature may be made available to a user device via a browser on the user device that is communicating with the CCAP. For example:

(i) Auto-select—In case of a one-to-one configuration (one user device is dedicated to one app, e.g. a NFC-enabled Android tablet at the entry of a building corridor is used exclusively for time and attendance) auto select the application (ii) App selector—present to the user on the device an app selector dashboard—e.g. select this logo/button for time attendance (Kronos) select here for cashless payment (Apriva)

(iii) Combination (of i and ii): wherein an App preselection is made based mobile device parameters or the ones of a secondary card (as in point (iii) above with respect to Authentication).

Regarding data storage, a Service Provider may be given the ability to store and retrieve data related to a specific card and a specific Service Provider on the CCAP. In some embodiments, an API is provided on the CCAP that enables the Service Provider to store and retrieve data related to a specific card and a specific Service Provider. The API can be configured to limit access to such data to only those Service Providers that are intended to access the data, thereby ensuring the data is secure.

Regarding federation, once the application and/or service has been selected, the CCAP may create a federation/authentication token (e.g., Session Authentication Markup Language (SAML) token, an Open Authentication Standard token such as OAUTH, or the like) to federate via the browser to the specific selected Service Provider (e.g., federation landing page) including an assertion to the Service Provider from the CCAP that proves the authenticity of the card. This federation token may also cause the browser of the user device to transmit other parameters to the Service Provider such as optional card related data stored in the CCAP.

Management tools are also provided in accordance with embodiments of the present disclosure. Examples of management tools capabilities: (1) user devices (e.g., the devices that are tapped against a card); (2) card groups (e.g., by grouping cards together); (3) optional card data management that allows storage and/or update and retrieval of data specific, which can be specific for each service provider; (4) card group to application/service association, which can be the association between card groups and service providers that drive the application selector; and (5) service providers (e.g., name, logo, Service Provider federation endpoint).

The CCAP disclosed herein can provide at least the following advantages:

(i) Any NFC/BLE-capable user device with a browser can become a card accepting terminal capable of delivering apps and/or services to the user without any purpose-built application installed on the NFC/BLE-capable user device (ii) The association between cards and applications is managed centrally (e.g., by a card owner or administrator) in the management module(s) of the CCAP without the need to update any information on the card itself (iii) New applications are immediately available to all cards—all that is needed is to associate a new application to a card or specific card group (iv) Application/Service developers do not need to know any 'card technology' or learn to use a card SDK, they can develop using standard web-based development technologies—dramatically decreasing development and deployment times In some embodiments, the CCAP can be implemented as one or many servers connected to a communication network or multiple communication networks (e.g., the Internet or a private intra-net). The server(s) implementing the CCAP may be implemented as any type of server or collection of servers that have hardware including non-transitory memory (e.g., RAM, ROM, etc.), microprocessor(s), and one or more network interface components (e.g., Ethernet cards, Network Interface Cards, etc.).

In some embodiments, by virtualizing a card application or multiple card applications to remote servers (e.g., to the cloud), the ability to develop and deliver applications to cards and mobile devices interacting with cards will be made more efficient. In some embodiments, a card application (and the content thereof) can be virtualized on the CCAP.

Furthermore, the application(s) can be used in a frictionless manner (e.g., where the mobile device does not need a specific application stored thereon) such that only a browser is required.

As discussed above, application/service providers can manager their application and the related data remotely and in a secure manner via one or more APIs exposed via the CCAP.

With the multiple applications provided on the cloud, the mapping of client devices to application(s) can allow for an application/service selector.

In further embodiments, when NFC and/or BLE capability is implemented in HTML5 and the phone applications CCAP will allow data to be written to the card via the CCAP (e.g., for offline checking).

Another feature enabled by embodiments of the present disclosure enable a user to tap a card against a user device and allow the user device to present/display a virtual badge that includes some or all information on the tapped card in addition to other information that is stored on the CCAP. For instance, the tapped card may have a picture printed thereon and may provide a card identification number to the mobile device along with a URL and/or TAC. When the user device refers to the CCAP vis-à-vis the URL, the CCAP may provide a stored picture back to the user device along with other card information. This allows a badge to be rendered as it was originally printed, thereby facilitating the ability to compare original badge print information with the card that was tapped by the user device.

In some embodiments, a CCAP is provided that generally comprises:

a card authentication module configured to authenticate at least one of a mobile device and a card read by a mobile device, wherein the authentication is based on information provided from the card to the mobile device;

an application/service selection module configured to provide a user of the mobile device with an option of selecting one or more applications for use with the card read by the mobile device, wherein the application/service selection module is further configured to identify a selected application based on receiving a user selection of an application; and a federation module configured to receive the identification of the selected application from the application/service selection module and, in response thereto, redirect at least one of a browser and application running on the mobile device to a Service Provider that is associated with the selected application.

In some embodiments, a method is provided that generally comprises:

receiving, at a server implementing a cloud card application platform, at least one message from a browser of a mobile device, the at least one message including a Universal Resource Locator (URL) corresponding to provided to the mobile device to a card read by the mobile device as well as a Tag Authentication Cryptogram (TAC) that indicates a unique read transaction occurred between the card and the mobile device;

authenticating, at the server implementing the cloud card application platform, a card number included in the URL and/or the TAC;

optionally identifying and authenticating the mobile device that read the card;

determining a number of applications stored on the cloud card application platform as a virtualized card application and associated with the read card and, in response thereto, performing at least one of the following:

(i) in the event that a single application is associated with the read card, automatically selecting the single application as a selected application; and (ii) in the event that multiple applications are associated with the read card, providing a user of the mobile device with an option to select one of the multiple applications as the selected application;

identifying a Service Provider associated with the selected application;

federating the Service Provider by creating a federation token that includes an assertion to the Service Provider that proves authentication of the read card by the cloud card application; and directing the mobile device to a URL hosted by the service provider.

As used herein, the terms "card", "credential", and/or "tag" may be used interchangeably to refer to a device having an IC chip, data stored on the IC chip, and an interface for communicating the data from the IC chip to a user device. It should be appreciated that such cards, credentials, and/or tags may be portable or non-portable in form factor and may facilitate contactless and/or contact-based communications with user devices. More specific examples of such cards, credentials, and/or tags are described in ISO standard 14443 and other related standards.

As used herein, the term "user device" and "mobile device" may be used to refer to any type of computational and/or communication device that is enabled to communicate with the cards, credentials, and/or tags as well as the CCAP. A user device or mobile device may be enabled to inherit or obtain access to certain card applications via the CCAP based on its interaction with a card, credential, and/or tag. A user device may be mobile or capable of being carried by a user. In some embodiments, the user device may simply include a browser (e.g., Internet Explorer (IE), Google Chrome, Firefox, Safari, or mobile variants thereof) and the user device does not necessarily need to also include a purpose-built application that enables the user device to communicate with the CCAP. Of course, embodiments of the present disclosure also contemplate that the user device may be equipped with a purpose-built application for such a purpose.

The present disclosure will be further understood from the drawings and the following detailed description. Although this description sets forth specific details, it is understood that certain embodiments of the invention may be practiced without these specific details.

DETAILED DESCRIPTION

Figure 1:
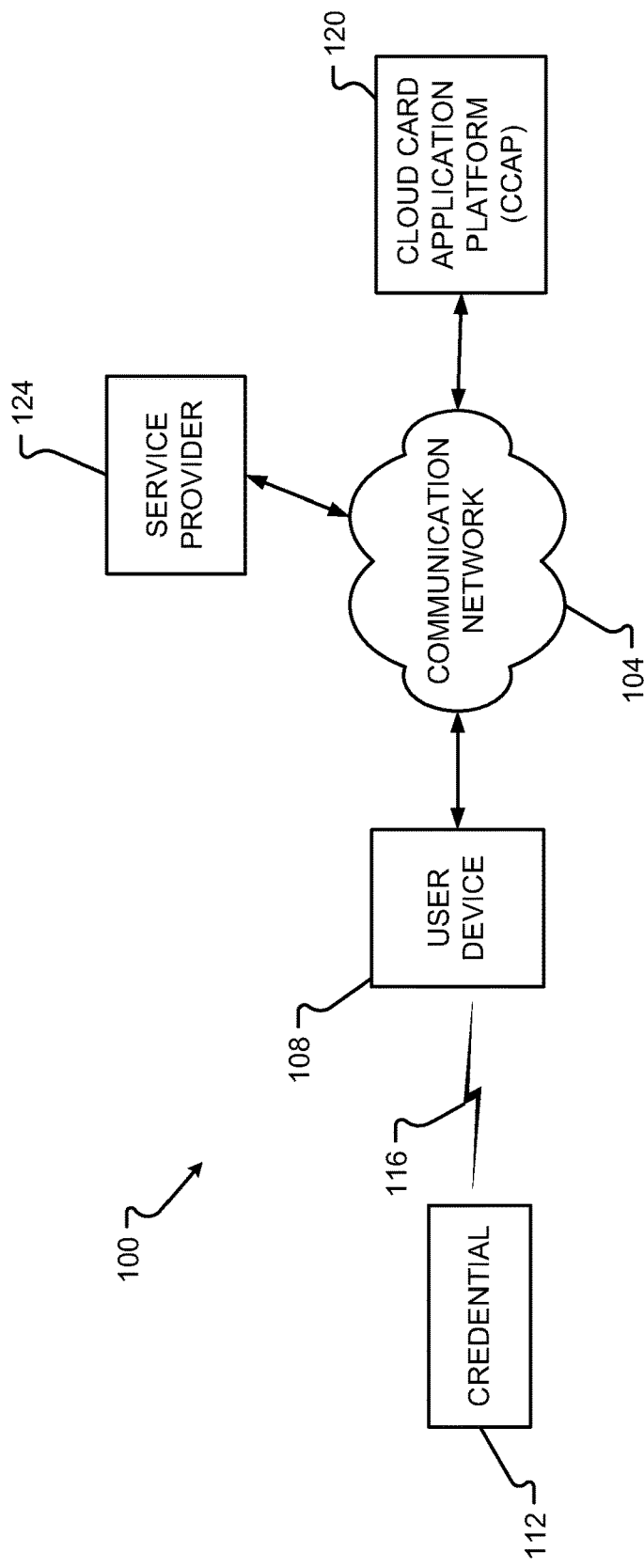
FIG. 1 is a block diagram depicting a communication system in accordance with embodiments of the present disclosure.

With reference initially to FIG. 1, a communication system 100 in which a CCAP 120 is utilized will be described in accordance with at least some embodiments of the present disclosure. The communication system 100 is shown to include a communication network 104 that provides communication capabilities between the CCAP 120, a user device 108, and one or more Service Providers 124.

The communication network 104 may include any type of communication medium or collection of communication equipment that enables remote communication devices to exchange information and/or media with one another using any type of known or yet-to-be developed transport protocol. The communication network 104 may facilitate wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network (e.g., 3G, 4G, LTE, etc.), and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

The user device 108 may correspond to a movable or stationary device capable of being operated by a user or multiple users. The user device 108 may correspond to a single device or multiple devices without departing from the scope of the present disclosure. The user device 108 may be capable of communicating with the CCAP 120 via the communication network 104 and any of the protocols supported by the communication network 104. The user device 108 may also be configured to exchange communications with a credential 112 via communication channel 116, which may utilize a proximity-based communication protocol. In some embodiments, the communication channel 116 may correspond to a BLE communication channel. In some embodiments, the communication channel 116 may correspond to an NFC communication channel. In some embodiments, the communication channel 116 may correspond to an Infrared communication channel. In some embodiments, the communication channel 116 may correspond to an Ultrasonic communication channel. Any other type of communication protocol that is dependent upon proximity and/or line-of-sight may be utilized between the user device 108 and credential 112. Other non-proximity-based protocols may also be used to exchange information between the credential 112 and user device 108. For instance, the credential 112 may comprise a barcode or Quick Response (QR) code printed thereon. The user device 108 may obtain information from the credential 112 by taking one or more images of the credential 112 and decoding the barcode and/or QR code. It should also be appreciated that a combination of channels 116 may be established between the credential 112 and the user device 108 to exchange different data over different channels.

The CCAP 120 may be administered and hosted by a trusted entity, which may be referred to herein as the CCAP administrator. In some embodiments, the CCAP is administered as a service made available via the communication network 104. The CCAP 120 may be implemented in one or more servers, a server cluster, one or more virtual machines executed on top of a hypervisor, a plurality of virtual machines, or the like. In other words, any configured of hardware and/or software components may be utilized to implement the CCAP 120. As will be discussed in further detail herein, the CCAP 120 may be utilized to virtualize one or more applications and/or services for the credential and make the virtualized applications and/or services available to the user device 108 without requiring the user device 108 to download or have a purpose-built CCAP application thereon.

The Service Provider(s) 124 may correspond to one or many different entities that develop and deploy and application or service to a user device 108 via the CCAP 120. In some embodiments, a Service Provider 124 is enabled to develop an application or service for a credential 112 and deploy that application or service virtually via the CCAP. As a non-limiting example, an application or service developed and deployed by a Service Provider 124 may be made available to a user device 108 when that user device 108 interacts with an appropriate credential 112. The application or service associated with the credential 112 that has interacted with the user device 108 may be made directly available to the user device 108 via the CCAP 120 or the CCAP 120 may redirect the user device 108 (or a browser executed thereon) to the Service Provider 124 that is responsible for developing and/or deploying the application or service that is associated with the credential 112. Thus, the service provider 124 does not have to directly deploy an application or service on each credential 112 in a possibly large population of credentials. Instead, the application and/or service can be virtualized by the CCAP 120 and made available to a plurality of different user devices 108 as long as those user devices 108 interact with an appropriate credential 112. Much like the CCAP 120, the Service Provider 124 may be executed with one or many servers that are also capable of communicating over the communication network 104.

Figure 2:
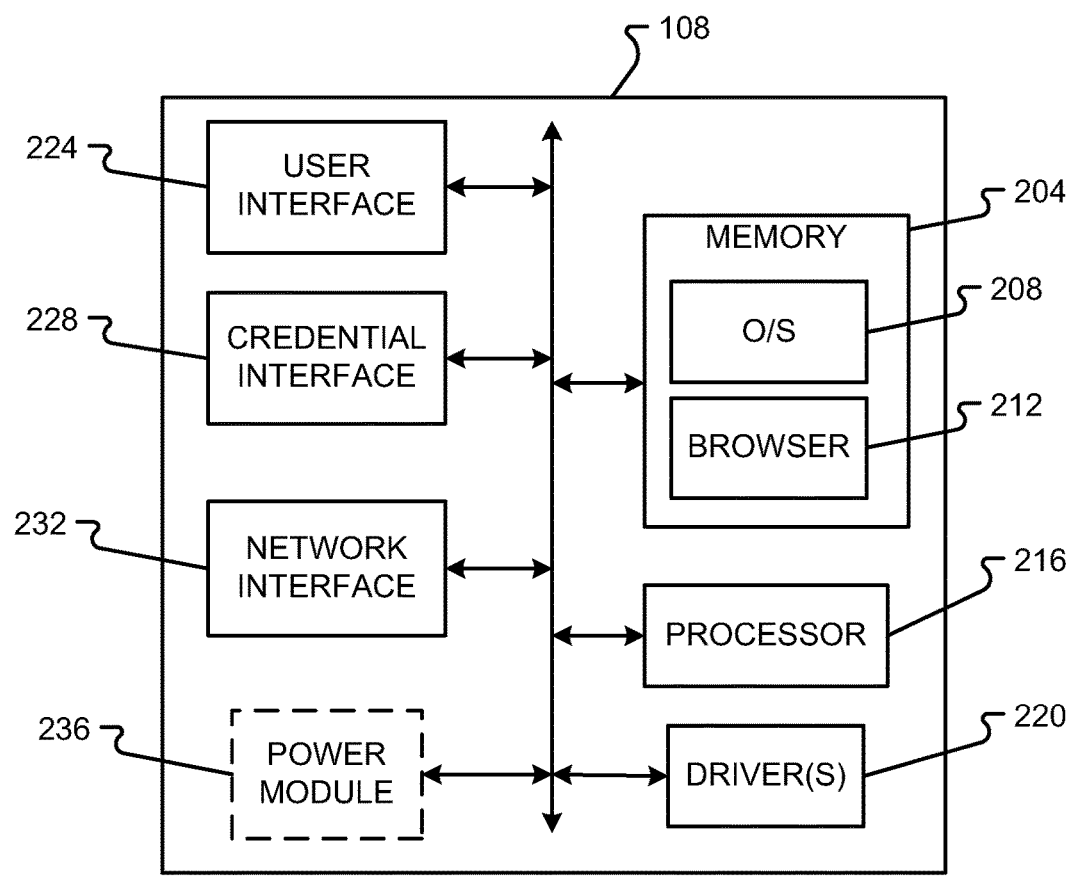
FIG. 2 is a block diagram depicting details of a user device in accordance with embodiments of the present disclosure.

With reference now to FIG. 2, additional details of a user device 108 will be described in accordance with at least some embodiments of the present disclosure. The user device 108 is shown to include computer memory 204 that stores one or more Operating Systems (O/S) 208 and a browser 212, among other items. The user device 108 is also shown to include a processor 216, one or more drivers 220, a user interface 224, a credential interface 228, a network interface 232, and a power module 236. Suitable examples of a user device 108 include, without limitation, smart phones, PDAs, laptops, PCs, tablets, net books, smart watches, and the like.

The memory 204 may correspond to any type of non-transitory computer-readable medium. In some embodiments, the memory 204 may comprise volatile or non-volatile memory and a controller for the same. Non-limiting examples of memory 204 that may be utilized in the user device 108 include RAM, ROM, buffer memory, flash memory, solid-state memory, or variants thereof.

The O/S 208 may correspond to one or multiple operating systems. The nature of the O/S 208 may depend upon the hardware of the user device 108 and the form factor of the user device 108. The O/S 208 may be viewed as an application stored in memory 204 that is processor-executable. The O/S 208 is a particular type of general-purpose application that enables other applications stored in memory 204 (e.g., the browser 212) to leverage the various hardware components and driver(s) 220 of the user device 108. In some embodiments, the O/S 208 may comprise one or more APIs that facilitate an application's interaction with certain hardware components of the user device 108. Furthermore, the O/S 208 may provide a mechanism for viewing and accessing the various applications stored in memory 208 and other data stored in memory 208.

The browser 212 may comprise an application stored in memory 204 that, when executed by the processor 216, presents a Graphical User Interface (GUI) to a user of the user device 108 via the user interface hardware 224 for displaying HyperText Markup Language (HTML) files, used to navigate the World Wide Web. Much like the O/S 208, the nature of the browser 212 may depend upon the form factor and capabilities of the user device 108. In some embodiments, the browser 212 corresponds to a particular type of application that simply enable the user device 108 to exchange communications with one or more web servers via the Hypertext Transfer Protocol (HTTP) or a similar web-based communications protocol.

The processor 216 may correspond to one or many microprocessors that are contained within the housing of the user device 108 with the memory 204. In some embodiments, the processor 216 incorporates the functions of the user device's 108 Central Processing Unit (CPU) on a single Integrated Circuit (IC) or a few IC chips. The processor 216 may be a multipurpose, programmable device that accepts digital data as input, processes the digital data according to instructions stored in its internal memory, and provides results as output. The processor 216 implement sequential digital logic as it has internal memory. As with most known microprocessors, the processor 216 may operate on numbers and symbols represented in the binary numeral system.

The driver(s) 220 may correspond to hardware, software, and/or controllers that provide specific instructions to hardware components of the user device 108, thereby facilitating their operation. For instance, the user interface 224, credential interface 228, and network interface 232, may each have a dedicated driver 220 that provides appropriate control signals to effect their operation. The driver(s) 220 may also comprise the software or logic circuits that ensure the various hardware components are controlled appropriately and in accordance with desired protocols. For instance, the driver 220 of the credential interface 228 may be adapted to ensure that the credential interface 228 follows the appropriate proximity-based protocols (e.g., BLE, NFC, Infrared, Ultrasonic, IEEE 802.11N, etc.) such that the credential interface 228 can exchange communications with the credential 112. Likewise, the driver 220 of the network interface 232 may be adapted to ensure that the network interface 232 follows the appropriate network communication protocols (e.g., TCP/IP (at one or more layers in the OSI model), UDP, RTP, GSM, LTE, Wi-Fi, etc.) such that the network interface 232 can exchange communications via the communication network 104. As can be appreciated, the driver(s) 220 may also be configured to control wired hardware components (e.g., a USB driver, an Ethernet driver, etc.).

As mentioned above, the user interface 224 may comprise one or more user input devices and/or one or more user output devices. Examples of suitable user input devices that may be included in the user interface 224 include, without limitation, buttons, keyboards, mouse, pen, camera, microphone, etc. Examples of suitable user output devices that may be included in the user interface 224 include, without limitation, display screens, lights, speakers, etc. It should be appreciated that the user interface 224 may also include a combined user input and user output device, such as a touch-sensitive display or the like.

The credential interface 228 may correspond to the hardware that facilitates communications with the credential 112 for the user device 108. The credential interface 228 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the credential interface 228 is specifically provided to facilitate proximity-based communications with a credential 112 via communication channel 116 or multiple communication channels 116.

The network interface 232 may comprise hardware that facilitates communications with other communication devices over the communication network 104. As mentioned above, the network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the user device 108 and the communication network 104 and may further be configured to encode and decode communications (e.g., packets) according to a protocol utilized by the communication network 104.

The power module 236 may include a built-in power supply (e.g., battery) and/or a power converter that facilitates the conversion of externally-supplied AC power into DC power that is used to power the various components of the user device 108. In some embodiments, the power module 236 may also include some implementation of surge protection circuitry to protect the components of the user device 108 from power surges.

Figure 3:
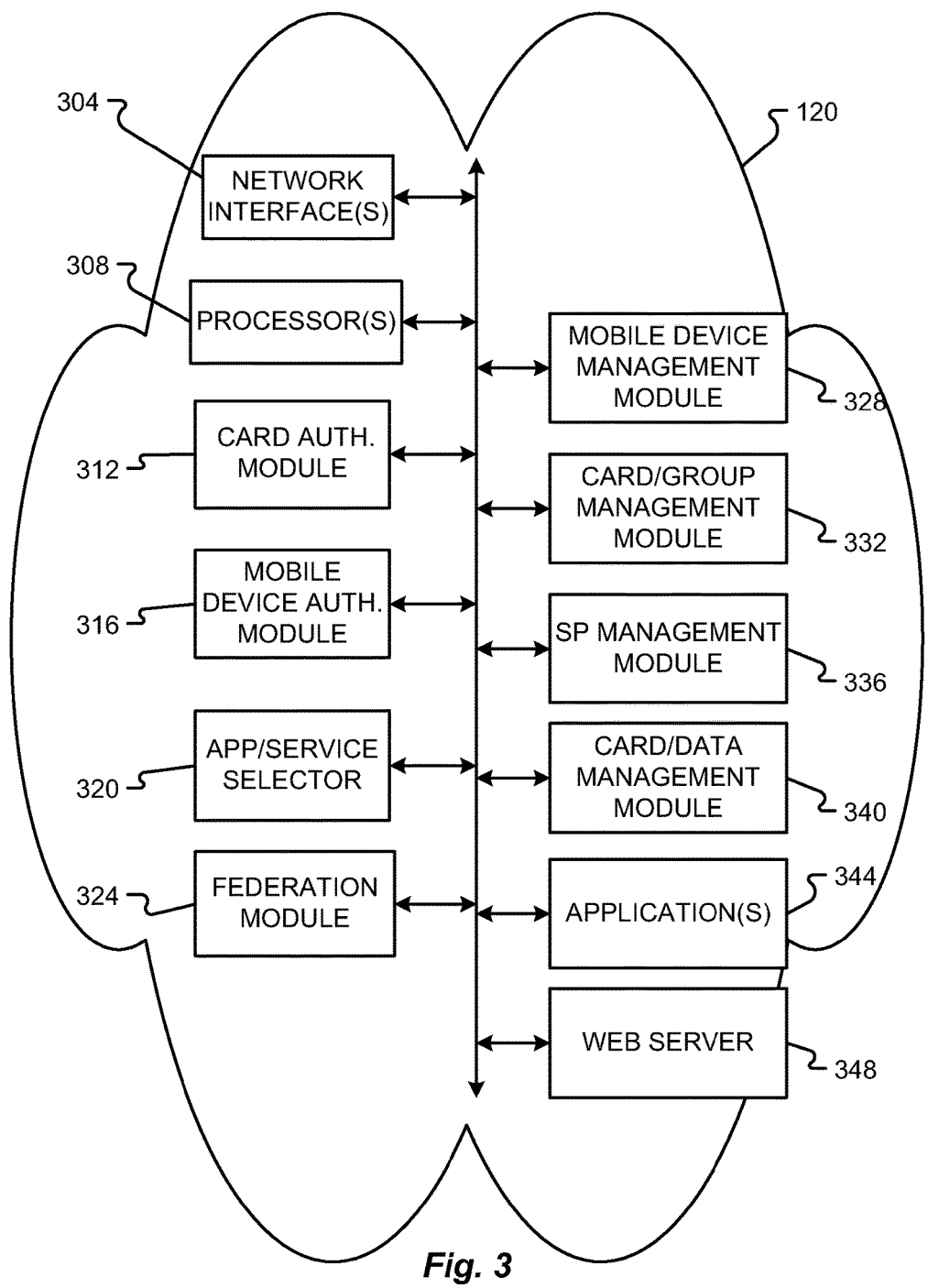
FIG. 3 is a block diagram depicting details of a CCAP in accordance with embodiments of the present disclosure.

With reference now to FIG. 3, additional details of a CCAP 120 and the components thereof will be described in accordance with at least some embodiments of the present disclosure. The CCAP 120 is shown to include one or more network interfaces 304, one or more processors 308, a card authentication module 312, a device authentication module 316, an application/service selector 320, a federation module 324, a device management module 328, a card/group management module 332, a Service Provider management module 336, a card/data management module 340, one or more applications 344, and one or more web servers 348.

As mentioned above, the CCAP 120 may be implemented as one or more real or virtualized servers and, therefore, may comprise one or more network interfaces 304, one or more processors 308, and one or more web servers 348 (e.g., a server capable of providing HTML pages to a browser 212 of a user device 108). The network interface(s) 304 may be the same or similar to the network interface(s) 232 and the processor(s) 308 may be the same or similar to processor(s) 216. Some or all of the modules and applications of the CCAP 120 may be stored in server memory or in an external database and may be executed by the processor(s) 308 of the CCAP 120.

The card authentication module 312 may provide the CCAP 120 with the ability to authenticate credentials 112 or the data contained thereon by analyzing data provided from the credential 112 to the user device 108 and then to the CCAP 120. As an example, the card authentication module 312 may be configured to analyze a URL, a TAC, or the like that was provided from the credential 112 to the user device 108 during an interaction between the devices. The card authentication module 312 may, based on the analysis of the URL and/or TAC determine that a particular credential 112 is a valid credential and is trusted (e.g., because the credential 112 provided a valid TAC along with the URL).

The device authentication module 316 may be configured to authenticate the user device 108 as opposed to authenticating the credential 112. For instance, a device 108 may be authenticated by analyzing information supplied by the user device 108 or a user thereof instead of information provided by the credential 112. As an example, the user device 108 may provide a response to a challenge issued by the CCAP 120 or the user device 108 may query its user for a secret (e.g., a PIN, password, or the like), that is provided to the CCAP 120 along with information received from the credential 112. The device authentication module 316 may analyze the information received from the user device 108 or the user thereof to determine if the user device 108 or the user thereof is also trusted and allowed to access one or more applications/services maintained by the CCAP 120.

The application/service selector 320 may be configured to map a credential 112 or information obtained from a credential 112 to an application or service maintained at the CCAP 120. For instance, a credential 112 may be associated with three applications, two of which are administered by a first Service Provider 124 and the other of which is administered by a second Service Provider 124. The three applications may be made available to a user device 108 that reads the associated credential 112. However, the application/service selector 320 may also be configured to automatically select an application or service to provide to the user device 108 that has read the associated credential 112. In other embodiments, the application/service selector 320 may prepare and present an application/service selection dashboard to the user device 108, thereby allowing a user of the user device 108 to select which application(s)/service(s) are desired for use by the user device 108. The user's selection can then be provided back to the CCAP 120, which utilizes the application/service selector 320 to make the selected application(s)/service(s) available to the user device 108.

The federation module 324 may correspond to a module that enables the CCAP 120 to federate the user device 108 to one or multiple Service Providers 124. For instance, the CCAP 120 may provide the ability to authenticate credentials 112, user devices 108, and users of user devices 108 prior to redirecting the user device 108 to a particular Service Provider 124. If the CCAP 120 has successfully authenticated the necessary elements involved in a transaction, the federation module 324 may be used to assert an indication of trust to the Service Provider 124, thereby allowing the Service Provider 324 to focus on providing the application/service to the user device 108 rather than further verifying the authenticity of the user, the user device 108, and/or the credential 112. In other words, the federation module 124 provides the mechanism by which the CCAP 120 can provide assertions of authentication to a Service Provider 124 in addition to redirecting a user device 108 to a particular Service Provider 124.

The management modules 328, 332, 336, and 340 may provide mechanisms for controlling, administering, and/or maintaining the applications/services 344 that are virtualized on the CCAP 120. The management modules 328, 332, 336, 340 may provide both APIs that allow Service Providers 124 and/or credential owners/administrators to manage applications 344 (e.g., SP management module 336), the data for the applications 344 (e.g., card/data management module 340), access permissions for the applications 344 (e.g., card/group management module 332), and user device 108 access permissions for the applications (e.g., device management module 328).

The applications(s) 344 may correspond to virtualized versions of credential applications. Examples of the types of applications 344 that may be provided via the CCAP 120 include, without limitation, physical access control applications, logical access control applications, timekeeping applications, Human Resource (HR) applications, workflow management applications, payment/EPV applications, financial applications, and the like. It should be appreciated that the applications 344 may be placed on the CCAP and administered by different Service Providers 124. Similarly, different credential 112 administrators may make some applications available to certain users, user devices 108, and/or credentials 112 whereas other applications 344 may have only a subset of users, user devices 108, and/or credentials 112 with access permissions. The application data and format may be administered/controlled by Service Providers 124 whereas user access to such applications may be controlled by the CCAP host and/or credential owners.

The web server(s) 348 may correspond to traditional and known mechanisms that enable the server(s) of the CCAP 120 to communicate with a user device 108, browsers 212 of user devices 108, and/or servers of a Service Provider 124. Specifically, the web server(s) 348 may be configured to provide HTML pages to a browser 212 and/or redirect a browser 212 to a web server of a Service Provider 124.

Figure 4:
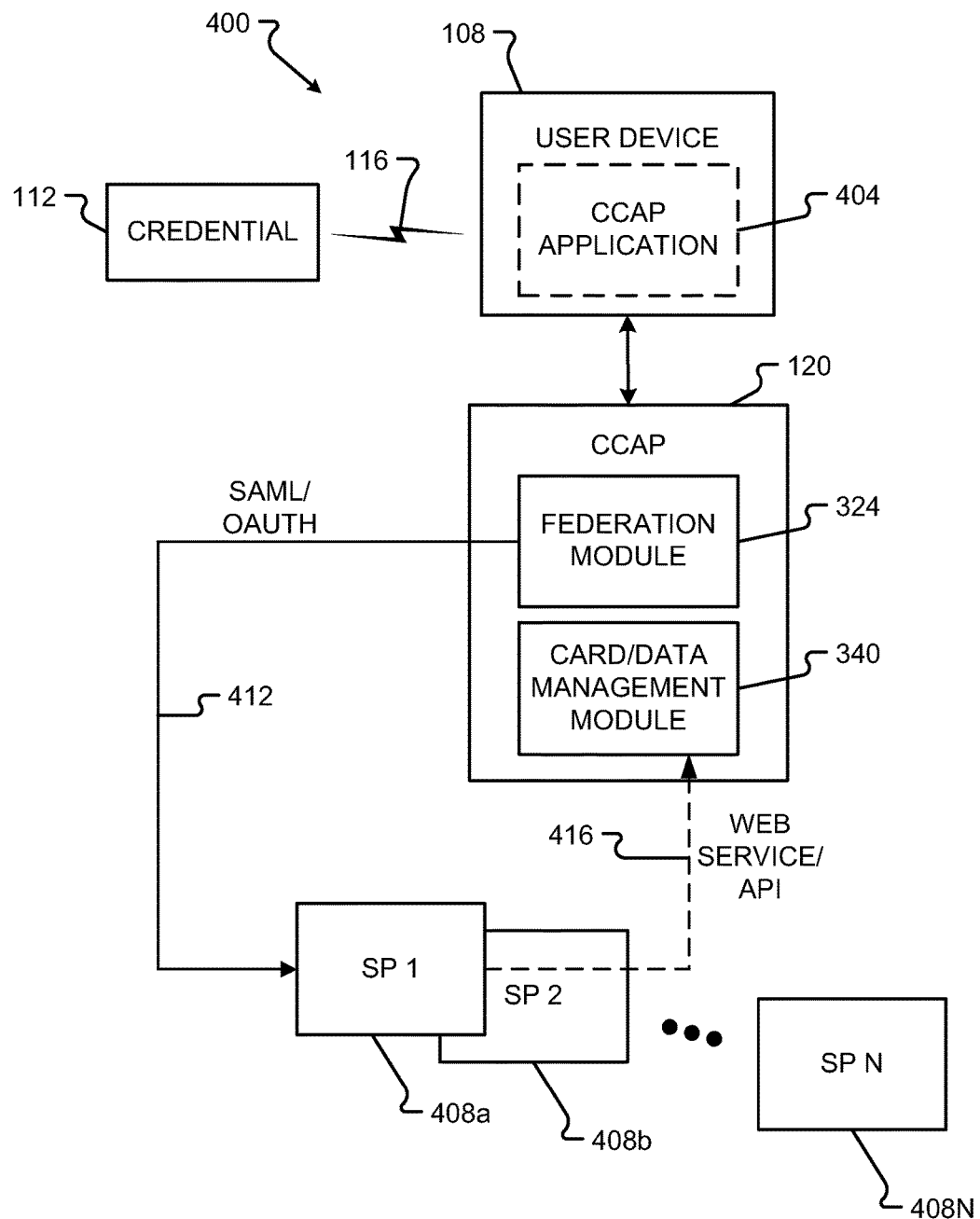
FIG. 4 is a block diagram depicting details of a Service Provider and CCAP interaction in accordance with embodiments of the present disclosure

With reference now to FIG. 4, additional details of the federation module 324 and card/data management module 340 will be described in accordance with at least some embodiments of the present disclosure. Specifically, FIG. 4 depicts a communication system 400 in which the CCAP 120 enables one or multiple Service Providers 408*a*-N (where N is any integer value greater than or equal to one) to administer applications 344 via access to the card/data management module 340. Likewise, the system 400 also shows how the CCAP 120 is able to help federate a user device 108 and/or credential 112 to a particular Service Provider 408*a*-N.

In some embodiments, the user device 108 may be provided with a purpose-built CCAP application 404 that enables the user device 108 to interact with the CCAP 120 in a particular fashion. The optional CCAP application 404 may help limit and control the commands sent from the user device 108 to the CCAP 120 and vice versa. Similarly, the CCAP application 404 may help present data received from the CCAP 120 to a user of the user device 108 via user interface 224. As discussed previously, however, the CCAP 404 may not be necessary as some or all interactions between the user device 108 and CCAP 120 can also be facilitated by browser 212. However, the CCAP application 404 provides another mechanism for controlling interactions between the user device 108 and CCAP 120.

As depicted in FIG. 4, the CCAP 120 may assert authenticity/trust for a credential 112 and/or user device 108 to a Service Provider 124 via an authentication channel 412. In some embodiments, the CCAP 120 provides an authentication token (e.g., SAML, OAUTH, etc.) to a Service Provider 408 that is administering an application 344 that is associated with a credential 112 and/or user device 108. In other words, when the user device 108 interacts with a particular credential 112 and then provides the data received from the credential 112 to the CCAP 120, the CCAP will identify an application 344 that has been virtualized for the particular credential 112. This associated application 344 is mapped to an administering Service Provider 408 and then the federation module 324 redirects the user device 108 that read the credential 112 to the administering Service Provider 408.

On the other end, each Service Provider 408 is allowed to access their applications stored on or made available via the CCAP 120 via the card/data management module 340. The Service Provider 408 can utilize the card/data management module 340 to change card data for a particular application, change behaviors of a particular application, remove an application from the CCAP 120, add new applications to the CCAP 120, update applications 344, and the like. If desired, the Service Provider 408 may make an application freely available to any user device 108, regardless of whether or not the user device 108 reads a particular credential 112. In other embodiments, a credential owner/administrator may restrict access to an application to only certain user devices 108 and/or certain user devices 108 that interact with certain credentials 112. This limitation of access can be done to control costs associated with distributing access to a particular application (e.g., if per-user license fees are paid for application access) or to control user access for other purposes (e.g., to ensure that only certain users or groups of users are allowed to access certain physical or logical assets in an enterprise).

Figure 5:
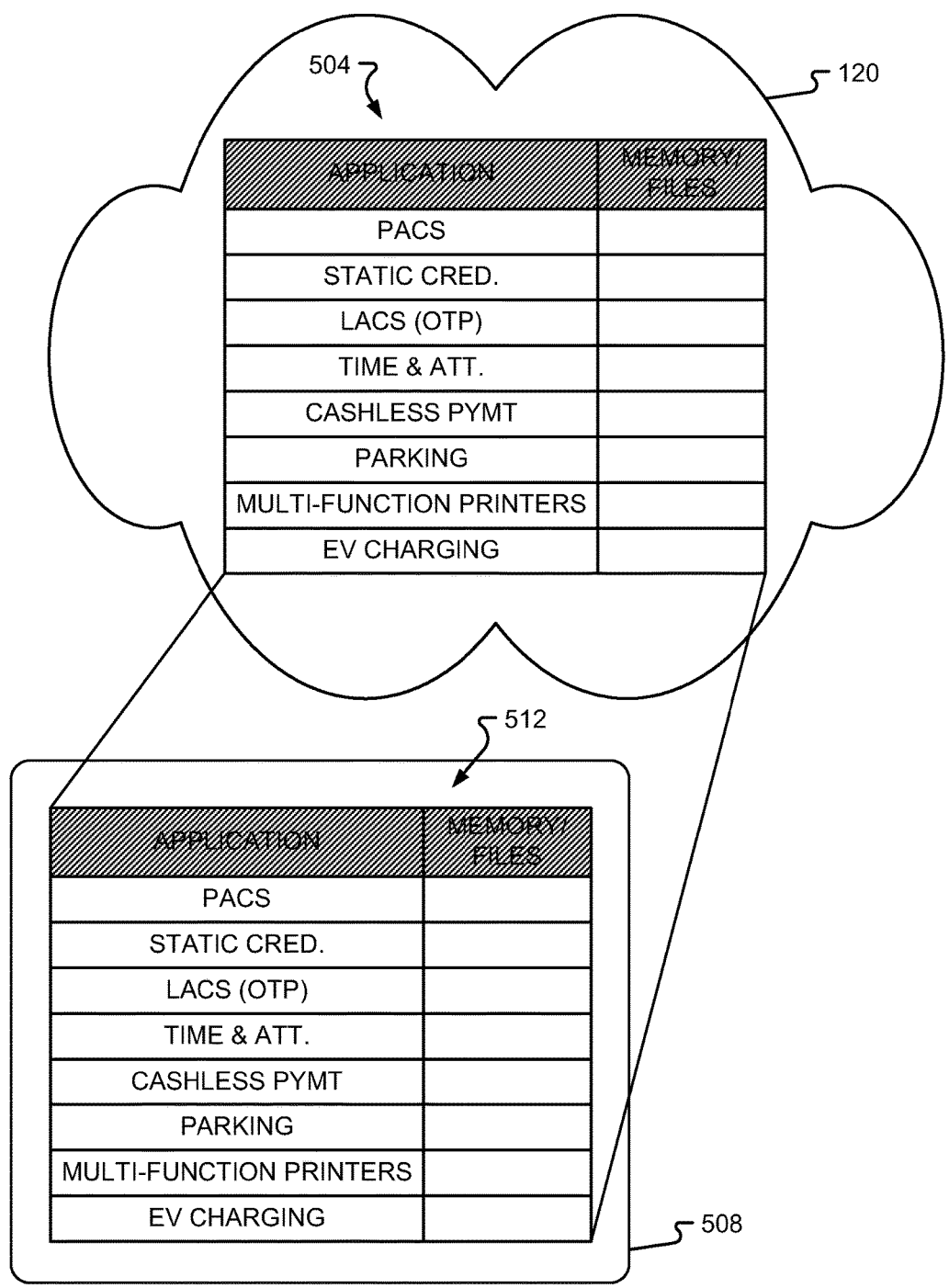
FIG. 5 is a block diagram depicting details of a virtualized credential in accordance with embodiments of the present disclosure.

FIG. 5 depicts an example of a virtualized credential application 504 and the data therefor maintained on the CCAP 120. Specifically, an actual credential 508 may have its data and instructions 512 virtualized in the form of a virtualized credential application 504. The virtualization of application 512 enables a Service Provider 124 to allow user access to an application without having to go through the hassle of redistributing new credentials to an entire population of users. Moreover, updates to the virtual application 504 may be made nearly instantaneously because the Service Provider 124 is enabled to update the virtualized application 504 via the card/data management module 340.

The illustrative credential application 512 is shown to include a Physical Access Control System (PACS) application, a static credential application, a Logical Access Control System (LACS) or one-time password (OTP) application, a time and attendance application, a payment application, a parking application, a printing application, and an electric vehicle charging application. It should be appreciated that other types of applications may be administered by one or multiple different Service Providers 124 without departing from the scope of the present disclosure.

Figure 6:
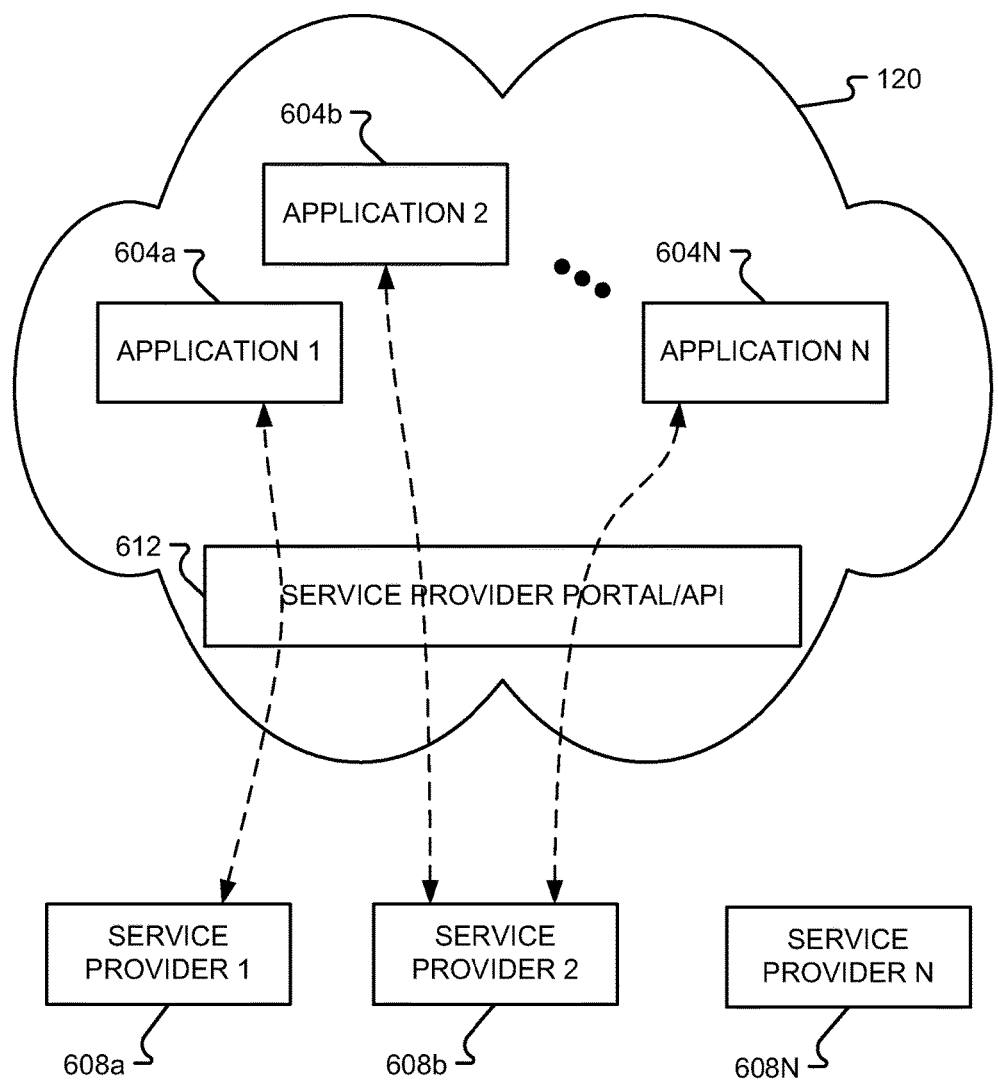
FIG. 6 is a block diagram depicting details of a Service Provider portal in accordance with embodiments of the present disclosure.

With reference now to FIG. 6, details of a Service Provider portal 612 will be described in accordance with at least some embodiments of the present disclosure. The Service Provider portal 612 is depicted as enabling one or more service providers 608*a*-N access to one or more applications 604*a*-N maintained on the CCAP 120. In some embodiments, the portal 612 may also be referred to as an API or similar type of interface that allows a Service Provider 608 to interact with one or more applications 604*a*-N in the CCAP 120. It should be appreciated that the number of Service Providers 608 does not necessarily have to equal the number of applications 604 on the CCAP 120. In other words, the depiction of "N" applications 604 and Service Providers 608 should not be construed as meaning that there must be an equal number of applications 604 and Service Providers 608, although such a scenario may be true.

The Service Providers 608*a*-N may be the same or similar to the Service Providers 124 and/or 408*a*-N and may correspond to entities, groups, individuals, or organizations that are responsible for developing and maintaining virtualized services on the CCAP 120 in the form of applications 604*a*-N. Likewise, the applications 604*a*-N may be the same or similar to the applications 334 and/or applications 404.

The portal/API 612 may comprise instructions that control the manner in which a Service Provider 608 interacts with a particular application 604. As an example, the portal/API 612 may have permissions defined therein that allow certain Service Providers 608 access to some applications 604 but not other applications 604. In the depicted example, the portal/API 612 allows the first Service Provider 608*a* to access the first application 604*a*. The second Service Provider 608*b* is allowed to access more than one application (e.g., second application 604*b* and Nth application 604N). The Nth Service Provider 608N is not allowed to access any of the applications 608*a*-N. Access to applications 604*a*-N may enforced by requiring certain Service Provider authentication steps (e.g., providing username and/or password) prior to allowing a Service Provider 608*a*-N access to an asset. Accordingly, the portal/API 612 may correspond to a landing page that restricts web access to the applications 604*a*-N unless the Service Provider 608 inputs a recognized and valid username and/or password. Alternatively or additionally, the portal/API 612 may comprise a firewall or some other security mechanism that limits to the applications 604*a*-N.

In addition to providing security for the applications 604*a*-N, the portal/API 612 may also define the way in which a Service Provider 608 is allowed to modify, change, or update an application 604. In some embodiments, the Service Provider 608 may correspond to an initial developer and publisher of an application 604. Once developed, the application 604 may be provided to the CCAP 120 such that it can be made available to users and user devices 108 via user device 108 interaction with a credential 112. The CCAP 120 host may correspond to a different entity than the Service Provider 608 and, in some embodiments, the CCAP 120 host may directly host the applications 604 after they have been developed by the Service Provider 608. In other words, the Service Provider 608 may initially code the application 604, by the CCAP 120 host may be responsible for storing the application 604 and controlling user access to the applications 604. When an application 604 needs to be updated, modified, deleted, or otherwise controlled by the Service Provider 608, the Service Provider 608 may utilize the portal/API 612 to achieve such access and control over the application 604.

Figure 7:
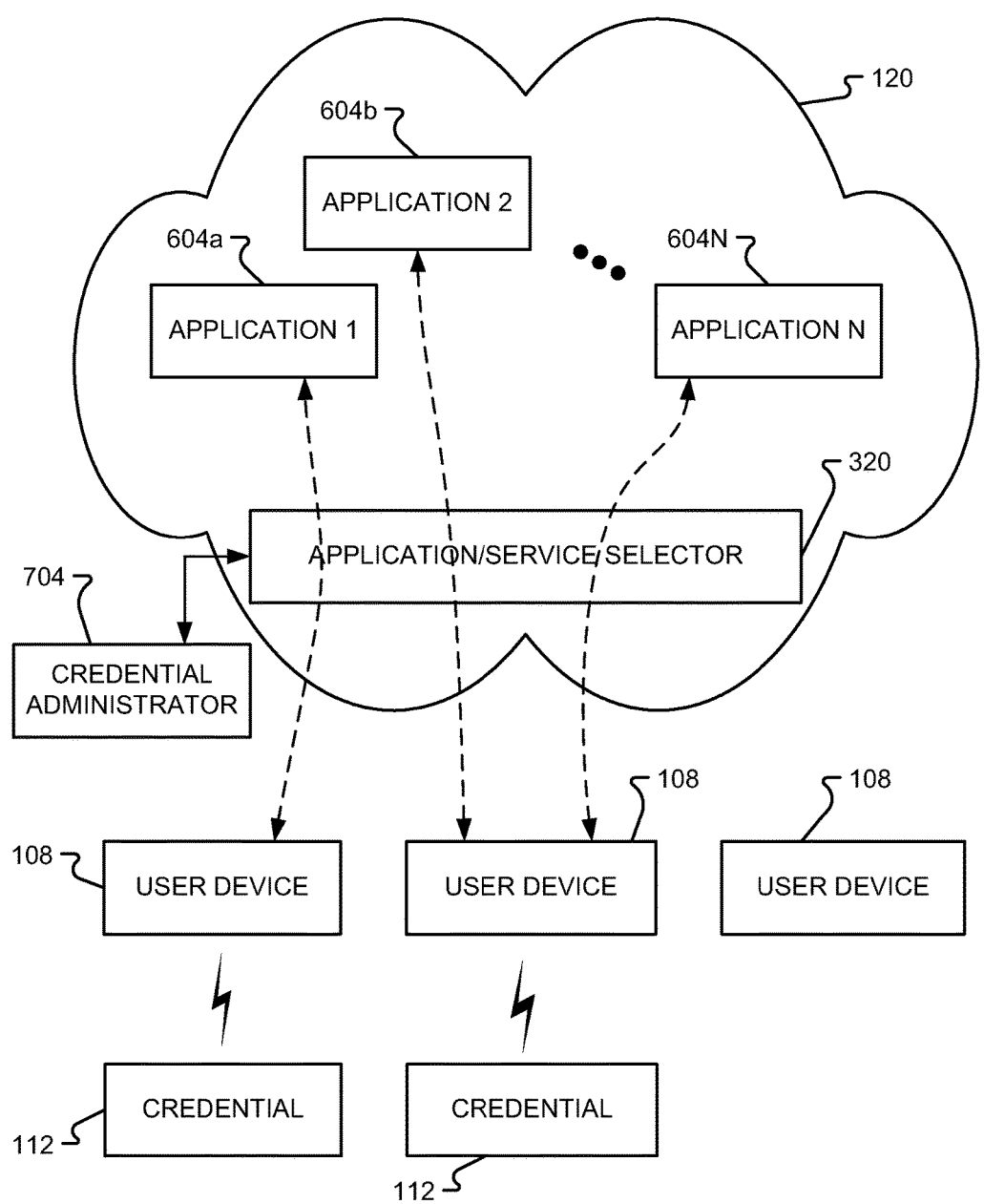
FIG. 7 is a block diagram depicting details of an application/service selector implemented in a CCAP in accordance with embodiments of the present disclosure.

With reference now to FIG. 7, additional details of an application/service selector 320 and the operation thereof will be described in accordance with at least some embodiments of the present disclosure. The application/service selector 320 is shown as providing the interface between a user device 108 and application 604*a*-N. As can be appreciated, the application/service selector 320 will control which, if any, applications 604 a user device 108 is allowed to access. In some embodiments, the selection of an application 604 for a user device 108 will depend upon the credential 112 with which the user device 108 just exchanged information. In some embodiments, the application/service selector 320 may also utilize inputs from a credential administrator 704 to determine which applications 604, if any, a user device 108 (or a user thereof) is allowed to access. In particular, a credential administrator 704 may correspond to an entity that has contracted with a Service Provider 608 to utilize an application 604 developed by the Service Provider 608. The Service Provider 608 may be entitled to certain revenues from the credential administrator 704 depending upon which applications 604 are used, the frequency with which such applications 604 are used, and which users and/or user device 108 are allowed permission to access such applications 604.

Because the Service Provider 608 may be realizing some benefit from user access to an application 604, the credential administrator 704 may provision the application/service selector 320 to define which user, group of users, user device 108, or group of user devices 108 are allowed to access certain applications 604*a*-N in the CCAP 120. For instance, if one user (or user device 108) is not allowed to access the first application 604*a*, but the user device 108 interacts with a credential 112 that provides directions to access the first application 604*a*, the application/service selector 320 may not allow the user (or user device) to access the first application 604*a* based on rules contained therein and provisioned by the credential administrator 704.

In some embodiments, the application/service selector 320 may automatically select an application 604 to provide to a user device 108 if the user device 108 interacts with a single virtualized credential (e.g., a credential 112 having directing the user device 108 to interact with a single application 604) or if the credential administrator 704 has defined that the user or the user device 108 employed by the user is only allowed access to a particular application. If, on the other hand, the user device 108 (or user) or the credential 112 directs the user device 108 to multiple applications (e.g., second application 604*b* and Nth application 604N), then the application/service selector 320 may provide a selection menu to the user device 108, thereby allowing the user to select one or more applications 604 with which to interact (as long as such permissions are not restricted by the credential administrator). In some embodiments, the application/service selector 320 may be integrated with the card/group management module 332 and/or mobile device management module 328.

Figure 8:
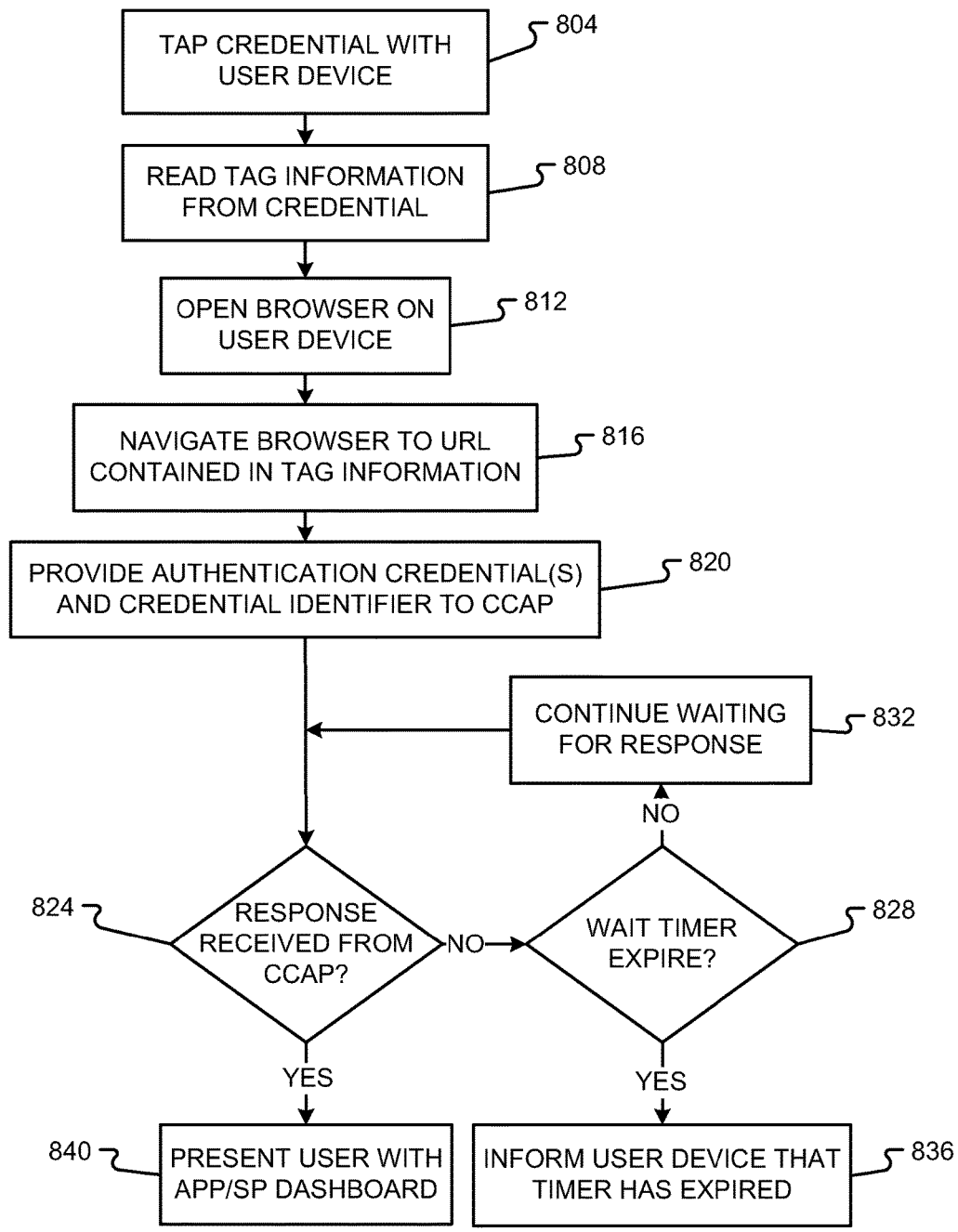
FIG. 8 is a flow diagram depicting an interaction between a credential and user device in accordance with embodiments of the present disclosure.

With reference now to FIG. 8, an interaction between a credential and user device will be described in accordance with embodiments of the present disclosure. The method begins when a user taps a credential 112 with a user device 108 (step 804). As can be appreciated, a "tap" may correspond to any action taken by the user that causes the user device 108 to be placed in communication proximity of the credential 112, thereby enabling creation of the communication channel 116. For instance, a user may place the user device 108 within a predetermined proximity (e.g., 5-8 meters for BLE or less than 1 m for NFC) of the credential 112. Other methods of tapping a credential 112 may include actually physically contacting the credential 112 with the user device 108, establishing an optical path between the credential 112 and user device 108, swiping the credential 112 through a magnetic reader integrated with or attached to the user device 108, or the like.

Once a communication channel 116 is established, the method continues with the user device 108 reading tag information from the credential 112 (step 808). In some embodiments, an authentication process (one-way or mutual) may occur between the user device 108 and credential 112 before tag information is passed from the credential 112 to the user device 108. In other embodiments, the tag information may be provided immediately to the user device 108 when the communication channel 116 is established. The tag information may include a URL, an IP address, a phone number, a hyperlink, or some other direction to a computing/processing/server resource. The tag information may also include a one-time password either separate from the direction to a resource (e.g., URL) or integrated with the direction to a resource. As an example, the one-time password and direction to a resource may be formatted as a Tag Authentication Cryptogram (TAC) or the like. The tag information may further include an identification of the credential 112, a manufacturer of the credential 112, and/or an administrator of the credential 704. The tag information may additionally include one or more commands that can be executed by the user device 108 (e.g., a command to open a browser 212, a command to open a CCAP application 404, or the like).

Upon receiving the tag information, the user device 108 may open its browser 212 (step 812) and navigate the browser 212 to a URL contained in the tag information (step 816). Of course, a URL is not necessarily included in the tag information. If another type of direction to a resource is contained in the tag information, then the user device 108 may utilize the appropriate application (if something other than a browser 212) to communication with the resource. In some embodiments, the URL may direct the browser 212 to the CCAP 120, a server hosted by the CCAP 120, or an application 344 hosted in the CCAP 120. In addition to navigating the browser 212 to the URL, the user device 108 may provide the CCAP 120 with authentication credentials for the user device 108, authentication credentials for the user of the user device 108, authentication credentials for the credential 112 read by the user device 108, and/or an identifier of the credential 112 read by the user device 108 (step 820). The user of the user device 108 may further be asked for a username and/or password if such additional protections are required for the application being accessed.

After the authentication credential(s), credential identifier, and other relevant information have been provided to the CCAP 120, the user device 108 will wait for a response from the CCAP 120 (step 824). If the user device 108 has not yet received a response and a wait timer has not yet expired (step 828), then the user device 108 will continue waiting for a response (step 832). If, however, the wait timer expires before the user device 108 receives a response (e.g., after 10 seconds, 30 seconds, or some other configurable amount of time), then the browser 212 may present a message to the user that the timer has expired (step 836).

On the other hand, if a response is received from the CCAP 120 before the wait timer expires, then the user device 108 will present the user with an application/service dashboard (step 840). In some embodiments, the dashboard may provide a list or menu of available virtualized credentials (e.g., applications 344) or if only one application 344 was available to the user or user device 108, the dashboard may provide a link or mechanism for navigating to the appropriate application 344 or service.

Figure 9:
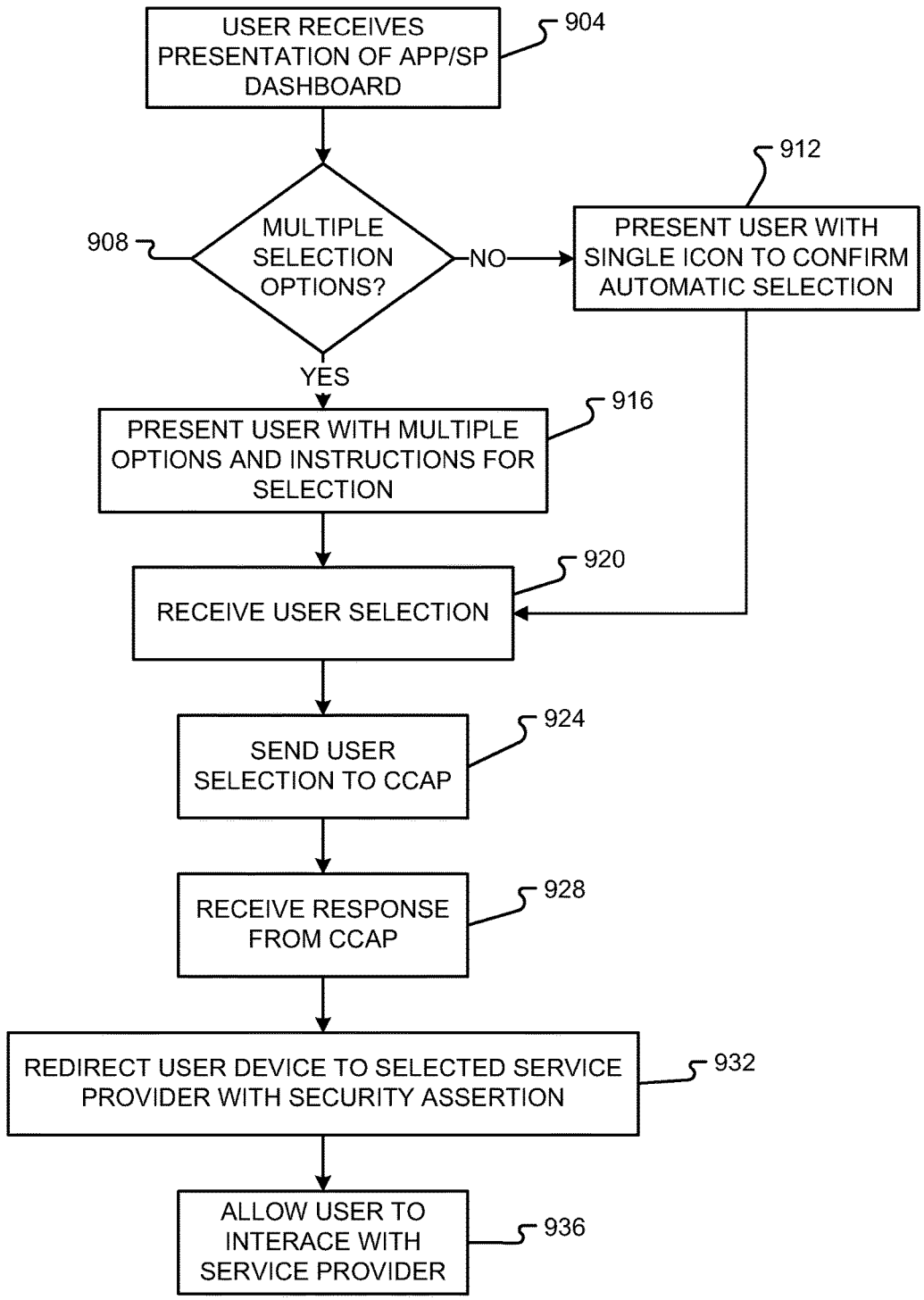
FIG. 9 is a flow diagram depicting an application/service selection method in accordance with embodiments of the present disclosure.

With reference now to FIG. 9, an application/service selection method will be described in accordance with embodiments of the present disclosure. The method begins when a user receives a presentation of the application/service selection dashboard (step 904). This dashboard may be presented via an interface of the browser 212 or in a view of a dedicated CCAP application 404. Physically, the dashboard may be presented via the user interface 224 of the user device 108.

The method proceeds by determining whether there are more than one selection options available to the user (step 908). Multiple selection options may be made available to a user depending upon permissions administered to the user, permissions administered to the user device 108, permissions associated with the credential 112 read by the user device 108, or a combination thereof. For instance, if a credential administrator 704 has enabled a group of users to have permission to use four different applications and the user holding the user device belongs to this group of users, and the user tapped a credential 112 enabling access to each of the four different applications, then the user's dashboard may present four different applications for selection by the user (step 916). If there is only a single application/service available to the user, then the dashboard will present the user with a single icon (or similar graphical representation) to confirm an automatic selection (step 912). It should be appreciated that the confirmation action in step 912 may be optional and the application/service selector 320 may automatically select the single application on behalf of the user without requesting any additional input.

Once an application/service selection has been made (either automatically or with user input) (step 920), the method continues with the user device 108 sending the selection to the CCAP 120 (step 924). In response to receiving the selection (step 928), the CCAP 120 redirects the user device 108 to the selected service provider associated with the selection application/service (step 932). In some embodiments, the CCAP 120 may also provide a security assertion with the redirection. In some embodiments, the security assertion may include an indication that the user or user device 108 has successfully authenticated with the CCAP 120 and, therefore, established a trusted relationship with the CCAP 120. The security assertion may be provided to the service provider in the form of an authentication token (e.g., SAML, OAUTH, etc.). The authentication token may be provided along with the redirection or in a separate communication between the CCAP 120 and service provider.

When the service provider receives the security assertion and determines that the user device 108 is attempting to access the selected application, the service provider leverages the security assertion provided by the CCAP 120 and knows that the user device 108 is trusted. This allows the service provider to begin immediately interacting with the user device 108 and providing one or more requested services or applications to the user device (step 936).

Figure 10:
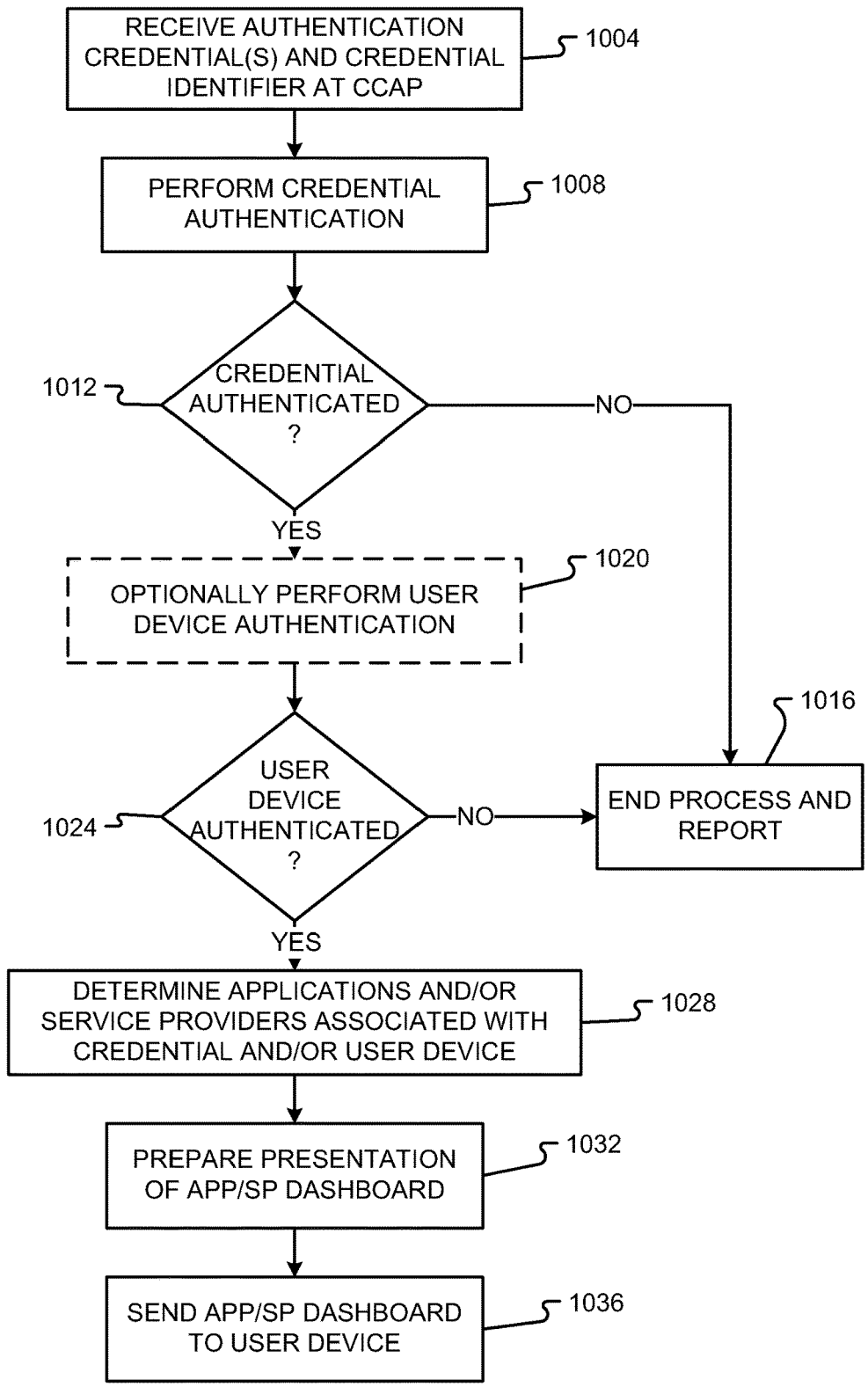
FIG. 10 is a flow diagram depicting an authentication method in accordance with embodiments of the present disclosure.

With reference now to FIG. 10, an authentication method will be described in accordance with embodiments of the present disclosure. The method begins when the CCAP 120 receives one or more authentication credentials and a credential identifier from a user device 108 (step 1004). In some embodiments, the authentication credentials and credential identifier may be retrieved, partially or completely, from a credential 112 that has just interacted with the user device 108. The authentication credentials may include credentials for the credential 112, credentials for the user device 108, and/or credentials for the user of the user device 108.

The CCAP 120 then employs its card authentication module 312 to perform a credential authentication (step 1008). In some embodiments, the card authentication module 312 may analyze some or all of the credential information and credential identifier to determine if such information matches known and valid information stored at the CCAP 120 (step 1012).

If the authentication process does not complete (e.g., the credential 112 is not authenticated), then the process ends (step 1016). Optionally, a report regarding the failed authentication and details surrounding the failed authentication (e.g., credential identifier that failed) may be generated and provided to a host of the CCAP 120. Alternatively or additionally, a service provider associated with the credential 112 or the application trying to be accessed may also be made aware of the failed authentication.

If the credential authentication process is successfully completed, then an additional and optional step of user device 108 authentication may be performed (step 1020). This authentication process may include authenticating the user device 108 and/or the user of the user device 108. A challenge/response protocol may be followed whereby the CCAP 120 requests certain information from the user and/or user device 108 and if such information is not provided to the CCAP 120, then the authentication process fails. Alternatively or additionally, the CCAP 120 may analyze information associated with the user device 108 (e.g., browser type being used to communicate with the CCAP 120, O/S being used by the user device 108, etc.) to determine if the user device 108 is trusted or at least capable of appropriate communications with the CCAP 120. If the user device 108 is not authenticated (step 1024), then the process continues to step 1016.

If the user device 108 is authenticated, then the process continues with the CCAP 120 determining the applications and/or service provider(s) that are associated with the credential 112 that has been tapped and/or the user device 108 that tapped the credential 112 (step 1028). In some embodiments, application and/or service providers may be selected via the application/service selector 320 and such selections can be based on user or group permissions administered by the credential administrator 704. In some embodiments, if application access is not restricted for by user or group, then the selection may simply depend upon the credential 112 that was tapped and/or the capabilities of the user device 108.

The applications and/or services determined in step 1028 are then presented to the user via the user interface 224 of the user device 108. Specifically, the application and/or service may be presented to the user via an application/service provider dashboard that is prepared at the CCAP 120 (step 1032) and then sent to the user device 108 (step 1036). In some embodiments, instructions for displaying the dashboard are sent to the user via an HTML page or in some other executable set of instructions.

Figure 11:
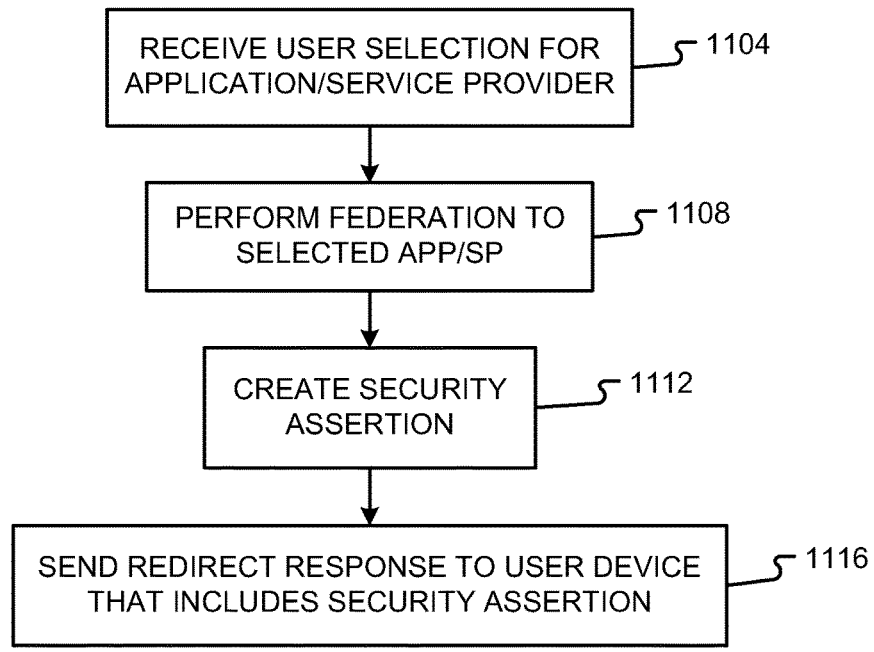
FIG. 11 is a flow diagram depicting a federation method in accordance with embodiments of the present disclosure.

With reference now to FIG. 11, a federation method will be described in accordance with embodiments of the present disclosure. The method begins when a user selection of an application or service is received at the CCAP 120 (step 1104). The selection may correspond to a selection of a single application/service or a selection of multiple applications and/or services.

In response to receiving the selection, the CCAP 120 employs the federation module 324 to perform a federation on the selected application/service(s) (step 1108). In particular, if a trusted relationship has been created between the CCAP 120 and user device 108 that tapped a credential 112 (e.g., via authentication), then the CCAP 120 will utilize the federation module 324 to create a security assertion (step 1112). In some embodiments, the security assertion may be in the form of an authentication token or multiple authentication tokens.

After the security assertion has been created, the method continues with the CCAP 120 sending a redirect response to the user device 108 that causes the user device 108 (or a browser 212 thereof) to redirect to a service provider associated with the selected application/service (step 1116). In addition to providing the redirection response, the CCAP 120 may also include the security assertion in the response so that the user device 108 will provide the security assertion to the service provider upon initial contact (e.g., when resolving the redirection response). In other embodiments, the CCAP 120 may send a first redirect response to the user device 108 and a second, but separate, security assertion to the service provider indicating an identity and assertion of security for the user device 108. In some embodiments, it may be desirable to include the security assertion in the redirect response so that the user device 108 can prove they are trusted using a single contact with the service provider.

Figure 12:
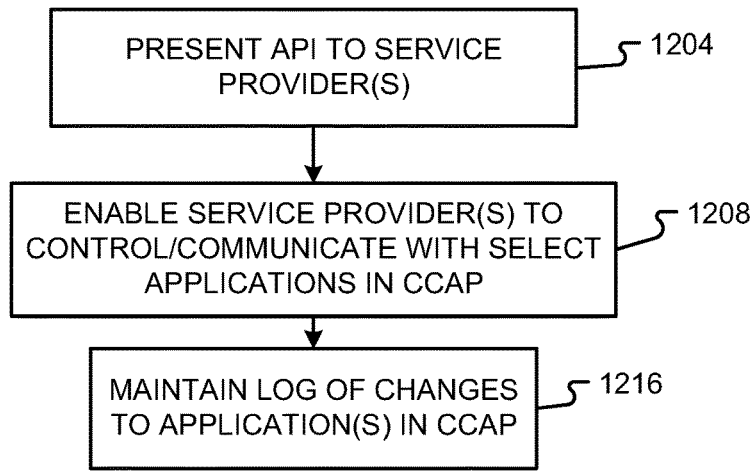
FIG. 12 is a flow diagram depicting a method of controlling applications in a CCAP in accordance with embodiments of the present disclosure.

With reference now to FIG. 12, a method of controlling applications in a CCAP 120 will be described in accordance with embodiments of the present disclosure. The method begins with the CCAP 120 presenting a portal/API 612 to service providers (step 1204). The portal/API 612 may be in the form of a web portal or the like and may define inputs and/or outputs that are available to a service provider for controlling, modifying, or deleting an application 604. Specifically, the portal/API 612 may enable the service providers to control and/or communication with selected applications 604 within the CCAP 120 (step 1208). It may also be desirable to maintain a log of changes or modifications made to applications within the CCAP 120 along with information describing who (e.g., what entity) made such changes and when such changes were made (step 1216). The log of changes may be maintained at the CCAP 120 and/or provided to the service provider responsible for developing and/or maintaining the particular application that was changed.

As can be appreciated by one of skill in the art, the portal/API 612 may be provided in a number of different formats. In some embodiments, the portal/API 612 may specify an application 604 (e.g., based on its operations or based on an identifier), available inputs for the application 604, available outputs for the application 604, and types of inputs/outputs available to the application 604. The portal/API 612 may also define a set of functionalities for an application 604 this is independent of the application's behavior.

The portal/API 612 may further enable a service provider to access databases or information used by a selected application 604. The portal/API 612 may be used to allow multiple service providers to interface with a single application 604, but in particular ways defined by each service provider. This allows different service providers to offer different services via a common application (e.g., via the portal/API 612). As with traditional APIs, the portal/API 612 may further include a library that specifies routines, data structures, object classes, and variables that are used by a particular application 604.

Figure 13:
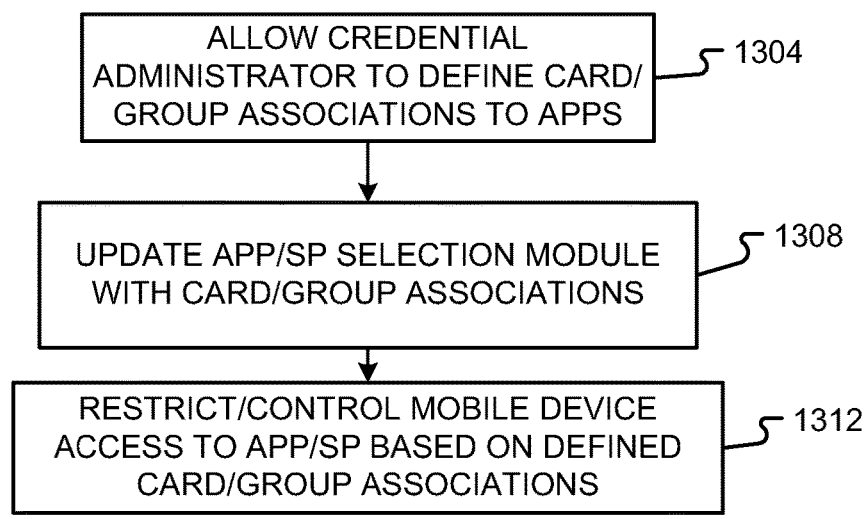
FIG. 13 is a flow diagram depicting an application/service to credential association method in accordance with embodiments of the present disclosure.

With reference now to FIG. 13, an application/service to credential association method will be described in accordance with embodiments of the present disclosure. The method begins when a credential administrator 704 is allowed to define card, user, and/or group associations to an application or service (step 1304). These types of capabilities may be made available to the credential administrator 704 via the application/service selector 320.

Based on the associations defined by the credential administrator 704, the application/service selector 320 may be updated with a latest definition of card, user, and/or group associations with applications or services (step 1308). In other words, when a credential administrator 704 updates the CCAP 120 to have a new or modified association, the application/service selector 320 immediately invokes the association rules and will restrict and permit user devices/users access to applications or services as appropriate (step 1312). By enabling a single point of association, a credential administrator 704 is not required to change the permissions for each user or credential in a controlled community. Instead, a single association between a group and an application can be made and the association permissions for all users belonging to that group are automatically updated, thereby easing the administrative burden on the credential administrator 704.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A cloud card application platform hosted at a network server, comprising:
  a processor; and
  computer memory comprising instructions that are configured for execution by the processor, wherein the instructions comprise:
    a credential authentication set of instructions that, when executed, enable the processor to authenticate a hardware credential read by a user device and authenticate that a unique interaction has occurred between the hardware credential and the user device, wherein the authentication is based on information provided from the hardware credential to the user device, and wherein the user device is one of a plurality of user devices that use the network server;
    an application/service selection set of instructions that, when executed, enable the processor to provide a user of the user device with an option of selecting one or more applications for use with the hardware credential read by the user device, wherein the option of selecting one or more applications is provided to the user in response to authenticating the hardware credential and in response to authenticating that the unique interaction has occurred between the hardware credential and the user device; and
    a federation set of instructions that, when executed, enable the processor to receive an identification of a selected application from the application/service selection module and, in response thereto, federate at least one of a browser and application running on the user device to a Service Provider that is associated with the selected application,
    wherein the information provided from the hardware credential to the user device comprises a Universal Resource Locator (URL) and a Tag Authentication Cryptogram (TAC) appended to the URL that indicates a unique read transaction occurred between the hardware credential and the user device.

2. The cloud card application platform of claim 1, wherein the instructions further comprise:
  a management set of instructions that, when executed, enable the processor to enforce access permissions to one or more applications stored in the cloud card application platform for at least one of: (i) a credential number, (ii) a group of credential numbers, (iii) a user identity, and (iv) a group of users.

3. The cloud card application platform of claim 1, further comprising a network interface that enables packet-based communications with the user device.

4. The cloud card application platform of claim 3, wherein the user device communicates with the cloud card application platform via at least one of HTTP and IP-based network protocols.

5. The cloud card application platform of claim 1, wherein the federation set of instructions further enable the processor to generate a federation token in response to receiving the identification of the selected application, wherein the federation token federates via a browser of the user device to the Service Provider, and wherein the federation token provides a proof of authenticity as determined by the card authentication module to the Service Provider, thereby enabling the Service Provider to trust that the hardware credential read by the user device has been authenticated.

6. The cloud card application platform of claim 5, wherein the federation token also provides data stored on the cloud card application platform that is associated with the selected application or the selected application for the specific credential that has been authenticated.

7. The cloud card application platform of claim 1, wherein the application is selected automatically by an application selector.

8. The cloud card application platform of claim 1, wherein the application is selected based on a user input received at the user device in response to the user of the user device being presented with an application selection dashboard by the application/service selection set of instructions.

9. The cloud card application platform of claim 1, further comprising:
   an Application Programming Interface (API) that enables a Service Provider to manage an application stored on the computer memory.

10. The cloud card application platform of claim 1, wherein the credential authentication set of instructions further enable the processor to authenticate one or both of the user device and the user of the user device.

11. A server, comprising:
   at least one processor; and
   memory comprising instructions that are configured for execution by the at least one processor, wherein the instructions comprise:
      a plurality of virtualized card applications each comprising one or more related files; and
      a card application selector set of instructions that cause the at least one processor to deliver one or more files associated with a card application to a mobile device in response to a selection of the card application from among the plurality of virtualized card applications, wherein the selection of the card application is either:
         (i) automatically selected by the at least one processor from among the plurality of virtualized card applications in the event that the card application is dedicated to the mobile device; or
         (ii) selected based on a user selection from a list of applications available to the mobile device,
      wherein the mobile device is to authenticate a hardware credential based on information provided from the hardware credential to the mobile device, wherein the information provided from the hardware credential to the mobile device comprises a Universal Resource Locator (URL) and a Tag Authentication Cryptogram (TAC) appended to the URL that indicates a unique read transaction occurred between the hardware credential and the mobile device.

12. The server of claim 11, wherein the at least one processor is enabled to provide the one or more files to the mobile device in response to the mobile device providing the server with at least one of a card and user identifier that is associated with the card application.

13. The server of claim 12, wherein the server further comprises a web interface that enables communications with the mobile device and delivery of the one or more files associated with the card application.

14. The server of claim 11, wherein the instructions further comprise an authentication set of instructions that enable the at least one processor to: (i) authenticate at least one of the mobile device and a card that is associated with the card application and (ii) authenticate that a unique interaction has occurred between the card and the mobile device.

15. The server of claim 11, wherein the card application selector set of instructions cause the at least one processor to generate and send the list of applications available to the mobile device via a selection dashboard.

16. A method, comprising:
   receiving, at a server implementing a cloud card application platform, at least one message from a browser of a mobile device, the at least one message comprising a Universal Resource Locator (URL) provided to the mobile device by a card read by the mobile device, wherein the at least one message further comprises a Tag Authentication Cryptogram (TAC) that indicates a unique read transaction occurred between the card and the mobile device;
   authenticating, at the server implementing the cloud card application platform, a card number included in the URL and/or the TAC;
   authenticating the mobile device that read the card;
   authenticating the TAC to ensure that the received URL corresponds to the unique read transaction;
   in response to authenticating the card number, authenticating the mobile device, and authenticating the TAC, determining a number of applications available to the mobile device, wherein the number of applications are stored on the cloud card application platform as virtualized card applications;
   performing one of the following:
      (i) in the event that the number of applications comprise a single application, automatically selecting the single application as a selected application; and
      (ii) in the event that the number of applications comprise multiple applications, providing a user of the mobile device with an option to select one of the multiple applications as the selected application;
   identifying a service provider associated with the selected application;
   federating the service provider by creating a federation token that includes an assertion to the service provider that proves authentication of the card by the cloud card application; and
   directing the mobile device to a URL hosted by the service provider.

17. The method of claim 16, wherein the user is provided with a selection dashboard that includes the multiple applications.

18. The method of claim 16, wherein the number of applications comprise the single application and wherein the method further comprises:
   notifying the user of the mobile device that the selected application was automatically selected.

* * * * *